Figure 1:
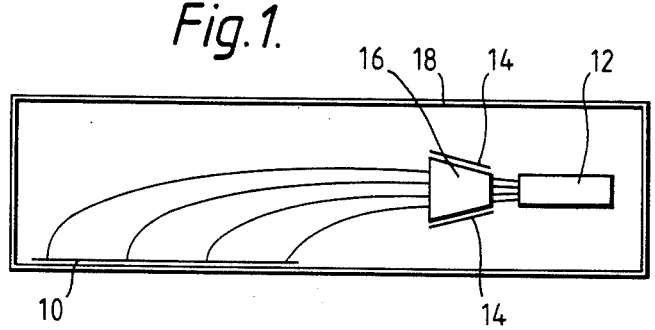

United States Patent [19]

Mallinson

[11] Patent Number: 4,760,313

[45] Date of Patent: Jul. 26, 1988

[54] CATHODE RAY TUBE DISPLAY SYSTEMS

[75] Inventor: Andrew M. Mallinson, Salem, N.H.

[73] Assignee: Ferranti Plc, Cheshire, England

[21] Appl. No.: 97,430

[22] Filed: Sep. 16, 1987

Related U.S. Application Data

[63] Continuation of Ser. No. 650,641, Sep. 14, 1984, abandoned.

[30] Foreign Application Priority Data

Sep. 15, 1983 [GB]  United Kingdom ............... 8324711

[51] Int. Cl.$^4$ .................... H01J 29/70; H01J 29/72; H01J 29/56
[52] U.S. Cl. ................................ 315/367; 315/366; 315/370
[58] Field of Search ............... 315/366, 367, 368, 370, 315/371; 313/422

[56] References Cited

U.S. PATENT DOCUMENTS 3,437,874  4/1969  Cressey et al. ................... 315/367
4,441,057  4/1984  Wrona .............................. 315/367
4,523,225  6/1985  Masuda et al. ................... 315/366

Primary Examiner—Theodore M. Blum
Assistant Examiner—Gregory C. Issing
Attorney, Agent, or Firm—Edward J. Kondracki

[57] ABSTRACT

A CRT display system providing a raster pattern, possibly for a flat screen CRT, has an oscillator driving a Line counter. The Line counter drives a Field counter and a Line DAC. The Field counter drives a Field DAC. In response, there are generated signals, representing functions, to be applied to the CRT deflection plates, and whereby there is represented the inverse of any function representing distortion of the raster pattern required to be corrected. At least one further DAC may be provided, comprising one of a pair of interacting DAC's, with one DAC driven by the Line counter, and one DAC driven by the Field counter, the output of said further DAC causing a combined function to be represented by the output of said other DAC. Said other DAC may comprise either the Line DAC, or the Field DAC; or said further DAC of another pair of interacting DAC's.

10 Claims, 10 Drawing Sheets

CATHODE RAY TUBE DISPLAY SYSTEMS

This is a continuation of application Ser. No. 650,641, filed Sept. 14, 1984, abandoned.

This invention relates to cathode ray tube display systems, and in particular, although not exclusively, to such systems each employing a so-called flat screen cathode ray tube (CRT), having an electron beam gun assembly extending parallel to the plane of a rectangular shaped CRT screen, in a plane only displaced by a small distance from the screen plane, the electron beam gun assembly when viewed together with the screen, with the CRT screen being viewed in plan, being displaced laterally from the CRT screen, and any required display is provided on the rectangular shaped CRT screen by the electron beam scanning over the screen with a conventional raster scan pattern. Such a CRT display system may comprise a television (TV) receiver; or an information display system, to dislay in an observable form information embodied within signals supplied to the display system, the signals supplied being of a form suitable to drive the display system in the required way.

In general, the present invention relates to any form of CRT display system in which means is required to be provided to correct for any form of distortion, otherwise obtained, for the raster scan pattern. However, only a flat screen CRT display system is referred to in this specification.

For a CRT display system not having the flat screen construction it is conventional to provide the required raster scan pattern by applying deflection signals in the form of linear-portion saw-tooth waveforms to the deflection plates, the desired saw-tooth waveforms being generated, possibly, solely by analogue means.

Inherently with the particular construction of a flat screen CRT display system referred to above, if such linear-portion saw-tooth waveforms are applied to the deflection plates, a distorted raster scan pattern, having a truncated fluted shape, is provided in relation to the flat screen CRT. For example, with the electron gun assembly extending parallel to an extension of the longitudinal axis of symmetry of the screen, the longitudinal axis of symmetry of the flute shaped raster pattern is coincident with the longitudinal axis of symmetry of the CRT screen.

It is known to correct for such truncated, flute shaped distortion of the raster scan pattern for a flat screen CRT display system by applying to the deflection plates appropriately non-linear portion saw-tooth waveforms generated solely by analogue means, and so that the provided raster scan pattern is coincident with, at least substantially, without distortion, having the same size, and shape as, the rectangular shaped CRT screen.

It is an object of the present invention to provide such a CRT display system, in which the required deflection signals to be supplied to the deflection plates, in order to cause the electron beam to scan in the required raster scan pattern, coincident with the CRT screen, also cause compensation for distortion, otherwise produced, for the raster scan pattern provided, and, in particular, for a flat screen CRT display system, the deflection signals provided cause the raster scan pattern also to have the same size, and shape, as the rectangular shaped CRT screen, the required compensation of an desired form being provided by employing digital means to drive digital to analogue converters (DAC's).

According to the present invention a cathode ray tube (CRT) display system includes distortion correction means for the CRT including digital means arranged to drive digital to analogue converters (DAC's), in response, the DAC's being arranged to generate functions to shape the waveforms of deflection signals to be applied to the deflection plates of the CRT, the deflection signals to cause a conventional raster scan pattern coincident with the CRT screen, and, in particular, the deflection signals to be applied to the deflection plates of a flat screen, in any such arrangement the digital means providing digital output signals, in response, the DAC's being arranged to generate the functions, each representative of variations of a corresponding analogue output from a DAC, the analogue output of a DAC, designated the Line DAC, being applied to the X deflection plates of the CRT, possibly via integrating means, at least partially to cause each raster line scan, the analogue output of a DAC, designated the Field DAC, being applied to the Y deflection plates of the CRT, the arrangement being such that the functions generated by the DAC's, and the waveforms of corresponding deflection signals to be applied to the deflection plates of the CRT, compensate for distortion, otherwise produced, of the raster scan pattern provided in relation to the screen, in each raster line scan period (t) the Line DAC being arranged to receive a first series of digital signals from the digital means at a first constant repetition rate, in each raster frame scan period (T) the Field DAC being arranged to receive a second series of digital signals from the digital means at a second repetition rate, there being one of the series of digital signals supplied to the Field DAC in each raster line scan period (t).

The digital means may comprise an oscillator having an output with a constant pulse repetition rate associated therewith, and arranged to be supplied to a counter, or to the equivalent thereof, such as to a register, herein referred to as the Line counter, in response, the Line counter to supply the required digital signals to at least the Line DAC, the Line counter being arranged to be reset after each raster line scan period (t), and, in response to resetting, supplying a pulse to a counter, or to the equivalent thereof, such a a register, herein referred to as the Field counter, in response, the Field counter to supply the required digital signals to at least the Field DAC, the Field counter being arranged to be reset after each raster frame scan period (T).

Conveniently, each digital and analogue signal provided and operated upon, within the distortion correction means for the CRT of the CRT display system is of differential form. However, if the outputs of either the Line DAC or the Field DAC is applied to the associated deflection plates via integrating means, the integrating means to provide sawtooth waveforms, the analogue output of the DAC causing required compensating factors to be applied to the sawtooth waveforms, it is not essential that the DAC operates upon differential digital input signals thereto, nor that, in response, the DAC provides differential analogue outputs therefrom.

The function generated by the Field DAC comprises, or has a constituent component thereof comprising, an appropriate linear function, having a predetermined slope associated therewith. The linear function of the Field DAC may be such that it has a zero value at the mid point of each raster frame scan period (T).

The function associated with the Line DAC, and/or with the Field DAC, may have a constituent component thereof comprising a predetermined non-linear function. Such a function inherently is non linear in form.

Apart from the required linear function or function components for the Field DAC referred to above, and except also for an appropriate corresponding linear function or function component required for the Line DAC, a possible constituent component of a function, hereinafter referred to as a function, and whether of linear, or a non-linear, form, generated at the output of the Field DAC, and/or at the output of the Line DAC, is required to be the inverse of any function representing distortion of the raster scan pattern required to be corrected, in respect of the output from the Field DAC, the distortion to be corrected being in relation to the X axis of the CRT screen, and in respect of the output from the Line DAC, the distortion to be corrected being in relation to the Y axis of the CRT screen.

At least one constituent DAC of a CRT display system in accordance with the present invention may provide an analogue current output, such an output from the Line DAC, or the Field DAC causing corresponding voltage deflection signals to be applied to the associated deflection plates.

Usually, each DAC required to generate a predetermined non-linear function, and possibly each DAC required to generate an appropriate linear function, has the so-called segmented form, when the DAC is arranged to provide an analogue current output, each constituent segment comprising a current source. In one form, each such current source comprises a bipolar transistor in series with a resistor, the function required to be generated by the DAC being represented by the relationship between successive resistors, of the series of resistors of the current sources of the segmented DAC.

Within the CRT display system there may be provided another DAC arranged to receive from the digital means the same series of digital signals as the Line DAC, said another DAC being referred to herein as the Field Correction DAC, and the analogue output of the Field Correction DAC, over each raster line scan period (t), is arranged to interact with the manner of operation of the Field DAC, over each raster frame scan period (T), the combined function generated thereby, at the output of the Field DAC, being the inverse of the function representing the distortion required to be corrected in relation to the X axis of the CRT screen.

When, at least, the Field DAC comprises a segmented DAC, as referred to above, the required interaction, between the output of the Field Correction DAC and the manner of operation of the Field DAC, is obtained by the variable analogue output of the Field Correction DAC causing corresponding variations in the gain of the Field DAC. When each digital and analogue signal associated with the Field DAC and the Field Correction DAC is of differential form, and when each constituent segment of the Field DAC comprises a current source, connected between two rails of the DAC, the two rails being common to each current source, usually, the gain of the Field DAC is varied by the differential analogue output of the Field Correction DAC causing a corresponding, variable voltage input to be supplied to the two rails common to the current sources of the Field DAC. Generally, a reference voltage is arranged to be applied between the two rails, and the arrangement may be such that the voltage input to the two rails, caused by the differential analogue output of the Field Correction DAC, is combined with the reference voltage, either being added to, or subtracted from, the reference voltage, before the reference voltage is applied between the two rails.

Thus, for example, a raster scan pattern, a least substantially, free from the truncated, flute shaped distortion, for the raster scan pattern with a longitudinal axis of symmetry parallel to the longitudinal axis of symmetry of the screen of a flat screen CRT, and otherwise obtained is capable of being produced in relation to the CRT screen.

It is a further object of the present invention to provide a flat screen CRT display system in which the electron gun assembly, possibly, inadvertently, does not extend parallel to the longitudinal axis of symmetry of the rectangular shaped CRT screen, and in which the required deflection signals to be supplied to the deflection plates, in order to cause the electron beam to scan in the required raster scan pattern, coincident with, and, at least substantially, free from the truncated, flute shaped distortion, and otherwise obtained, the raster scan pattern produced also having the same size, and shape, as the rectangular shaped CRT screen, and with the longitudinal axis of symmetry of the raster scan pattern not angularly displaced from the longitudinal axis of symmetry of the CRT screen, are generated by the digital means arranged to drive the DAC's.

AT least for such a CRT display system there may be provided another DAC arranged to receive from the digital means the same series of digital signals as the Field DAC, said another DAC being referred to herein as the Line Correction DAC, and the analogue output of the Line Correction DAC, over each raster frame scan period (T), is arranged to interact with the manner of operation of the Line DAC, over each raster line scan period (t), the combined function generated thereby, at the output of the Line DAC, being the inverse of the function representing the distortion required to be corrected in relation to the Y axis of the CRT screen. The interaction between the Line Correction DAC and the Line DAC may be, at least substantially, of the same form as that referred to above in relation to the interaction between the Field Correction DAC and the Field DAC. The Field Correction DAC may not be provided in such a CRT display system.

It is still a further object of the present invention to provide a flat screen CRT display system in which pin-cushion or barrel distortion of the display is to be corrected by appropriate deflection signals to be supplied to the deflection plates, and in which the appropriate deflection signals are generated by the digital means arranged to drive the DAC's.

Figure 2:
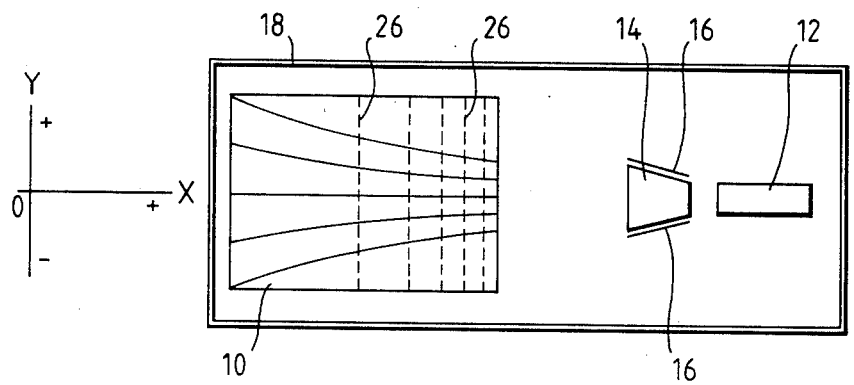
Figure 3:
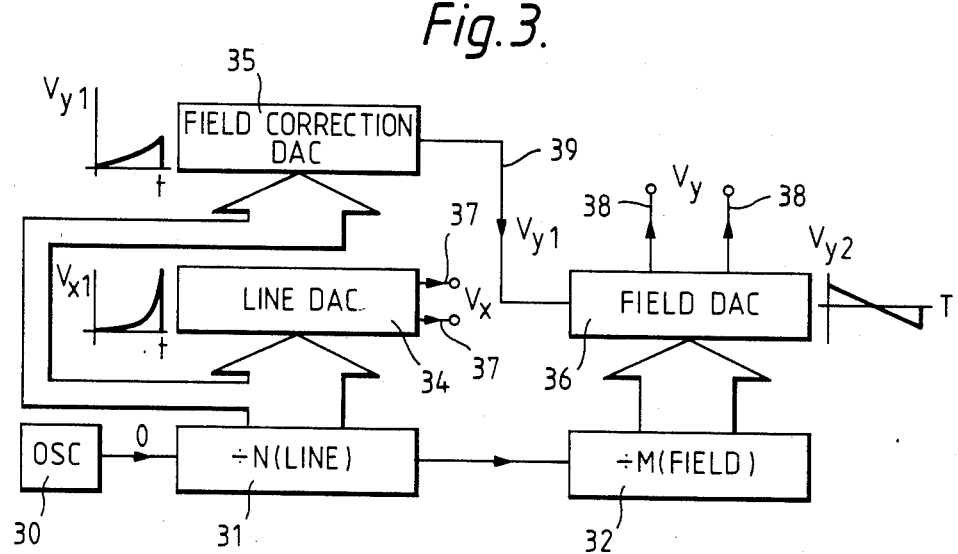

The present invention will now be described by way of example with reference to the accompanying drawings, in which:

FIG. 1 is a side elevation of the cathode ray tube (CRT) of a flat screen CRT display system, the side of the CRT envelope being omitted to show the screen, the electron gun assembly and the deflection plates of the CRT, there also being indicated electron beam paths impinging at spaced points along a raster line scan, of the raster scan pattern, provided by the CRT display system, FIG. 2 corresponds to FIG. 1, but is a plan view of the CRT, the front of the CRT envelope being omitted, to show the screen, the electron gun assembly and the deflection plates of the CRT, there also being indicated a distorted, truncated, flute shaped raster scan pattern provided on the CRT screen if linear-portion saw-tooth waveforms are applied to the deflection plates of the flat screen CRT display system, as would be so applied in a conventional CRT dislay system, FIG. 3 is a block diagram of an arrangement of digital means arranged to drive digital to analogue converters (DAC's), to generate the deflection signals to be applied to the deflection plates of the CRT of one embodiment of a CRT display system in accordance with the present invention, the arrangement being suitable to provide a raster scan pattern coincident with the CRT screen when the CRT comprises the flat screen CRT of FIGS. 1 and 2, and the raster scan pattern being at least substantially, free from the truncated, flute shaped distortion illustrated in FIG. 2.

Figure 4:
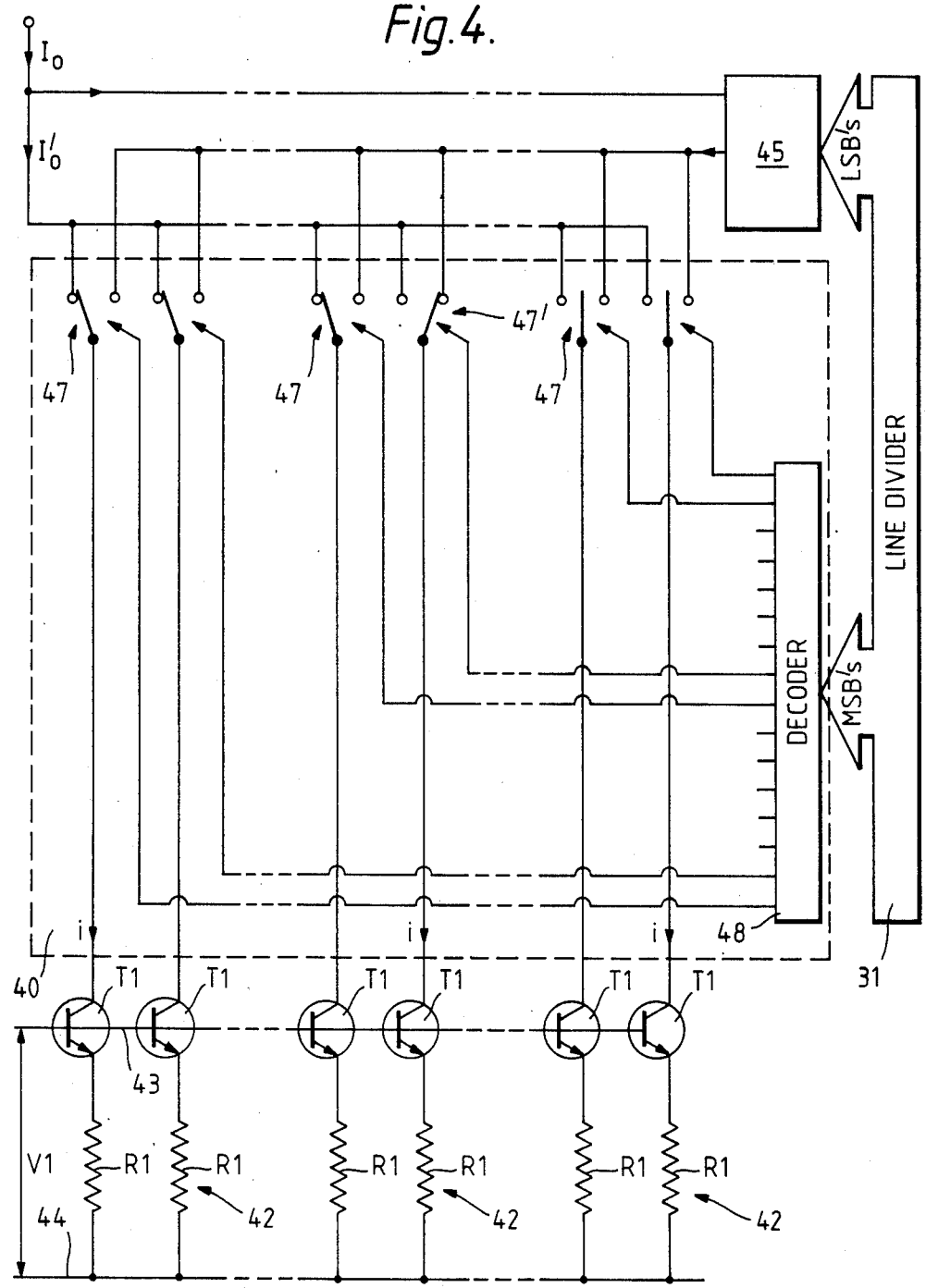
Figure 5:
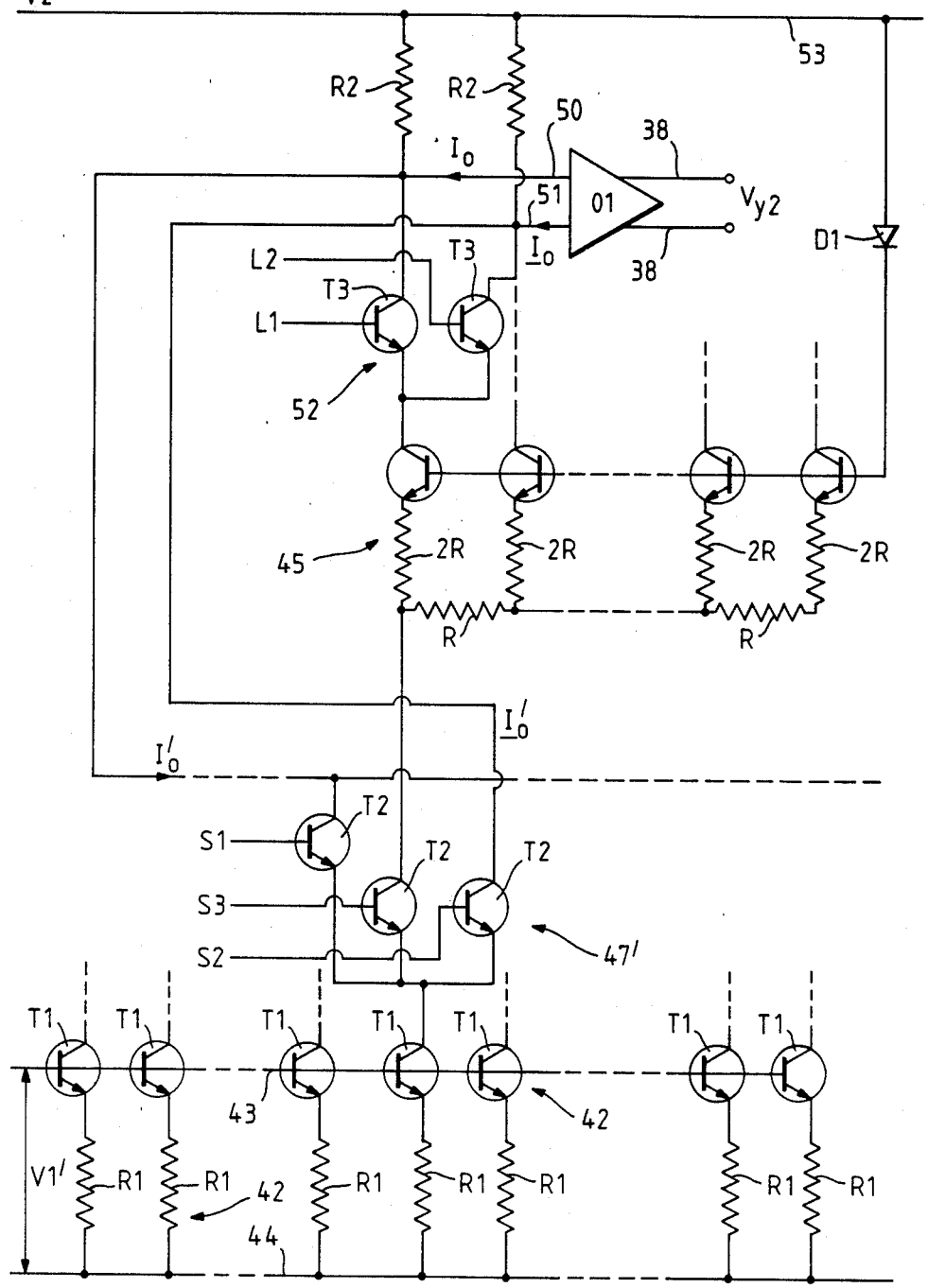
Figure 6:
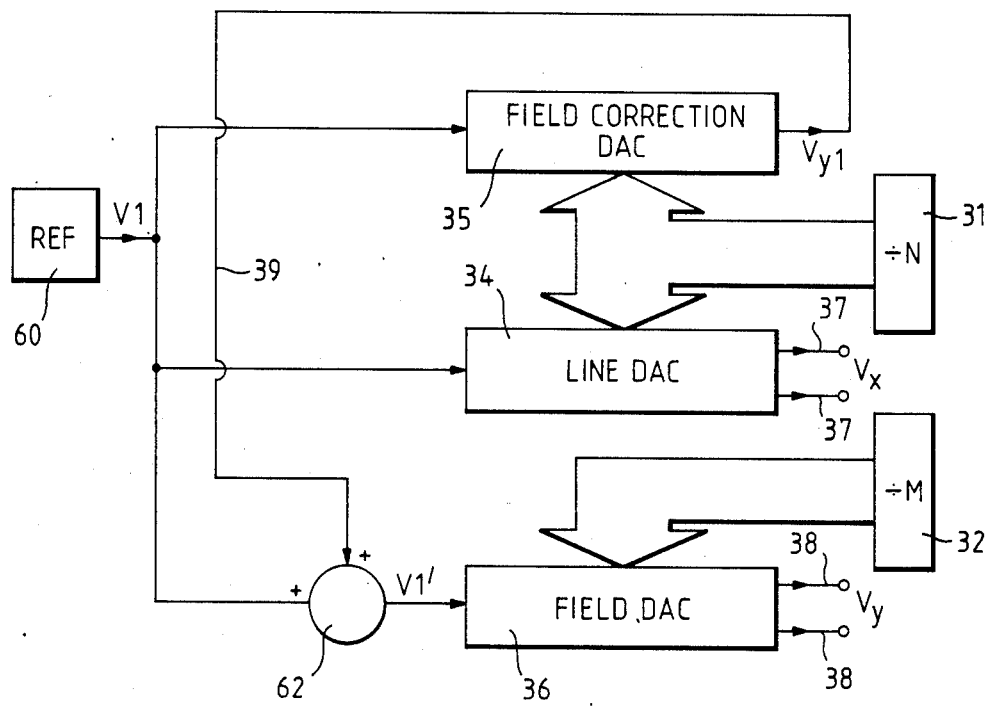
Figure 7:
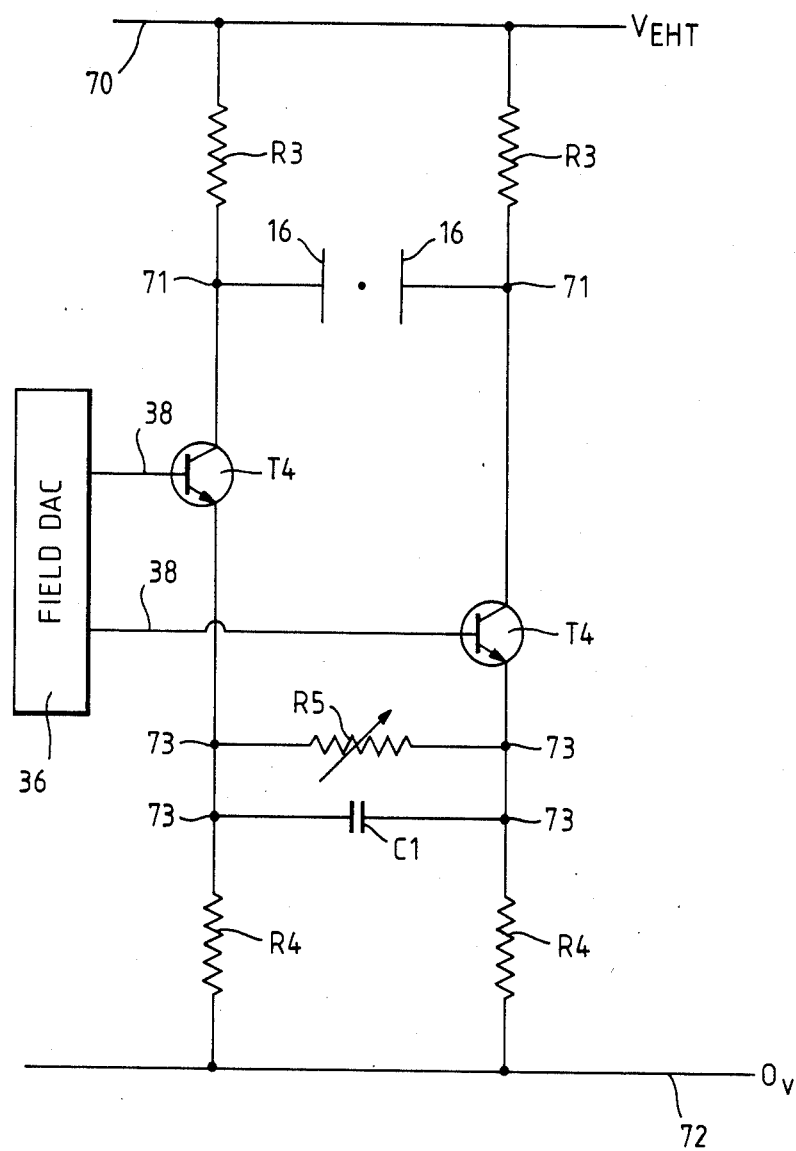
Figure 8:
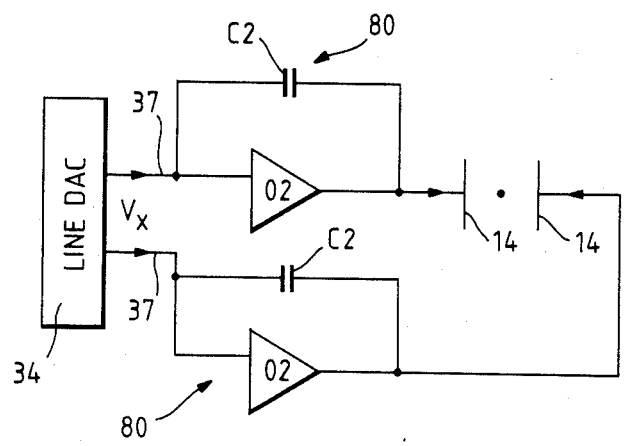
Figure 14:
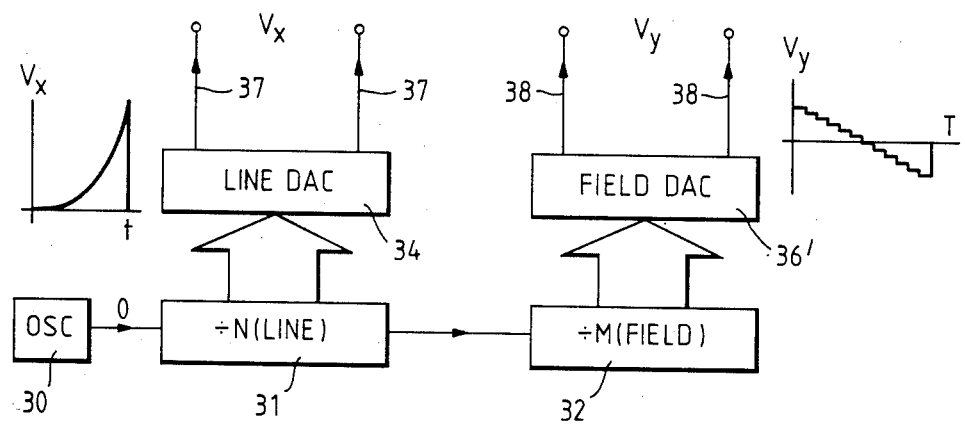
Figure 9:
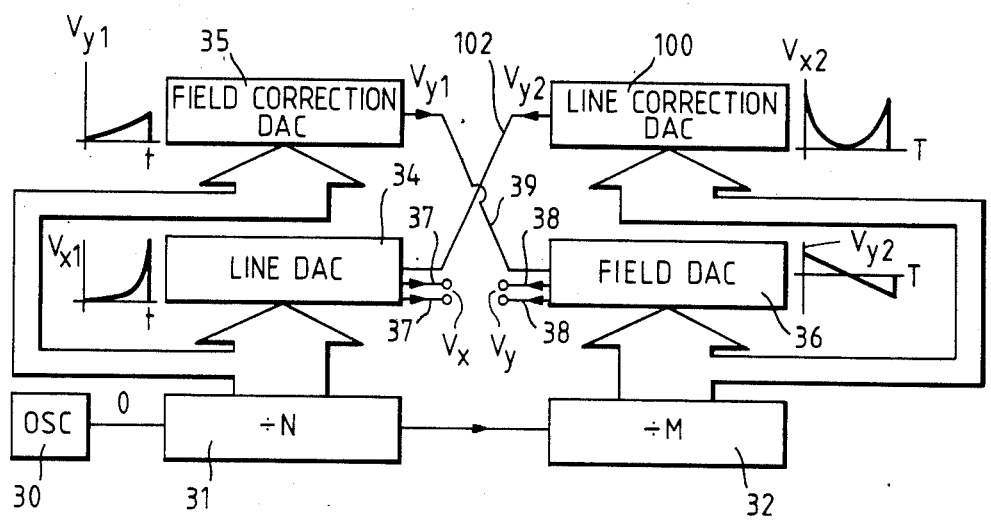
Figure 11:
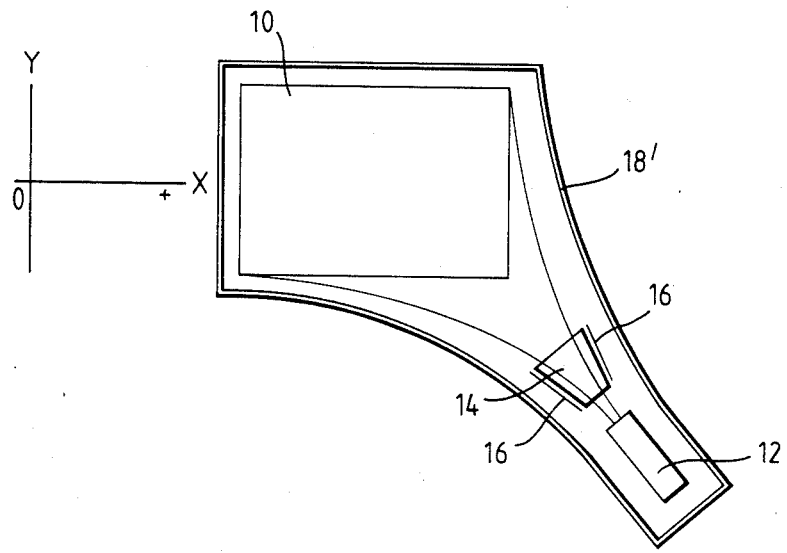
Figure 10:
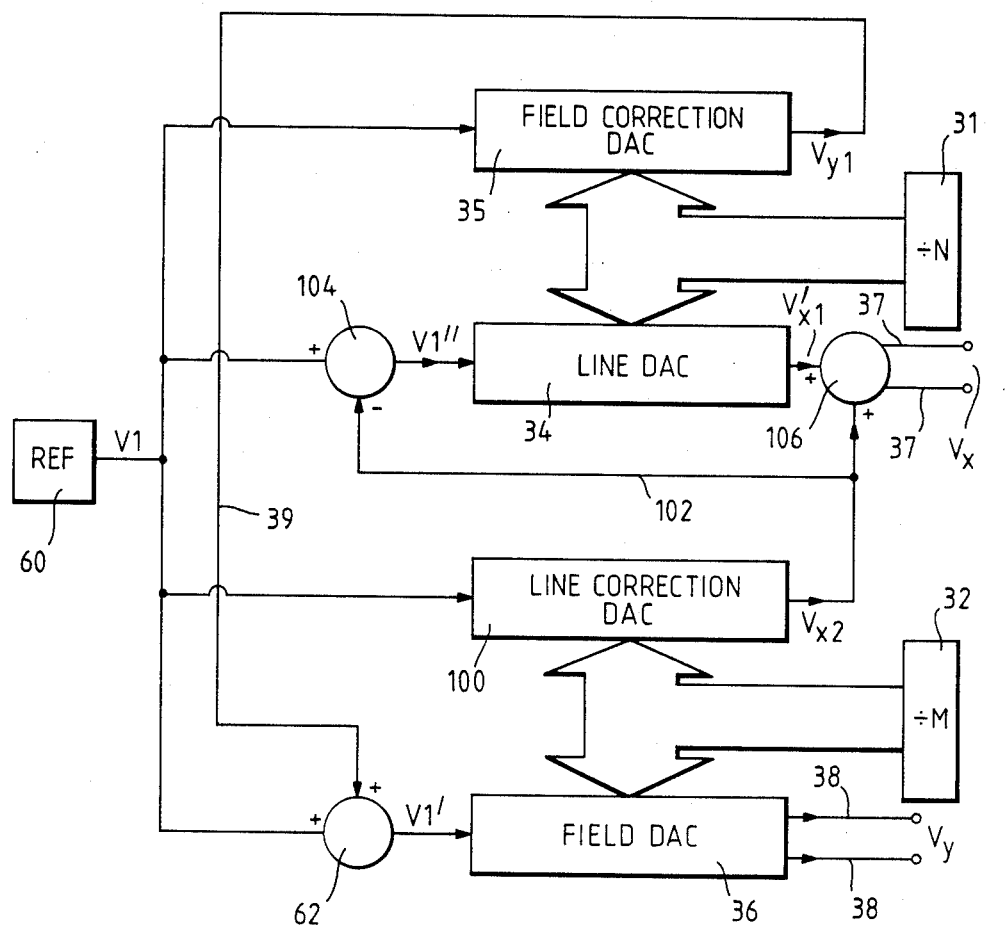

FIG. 4 shows, in schematic form, a so-called segmented DAC, arranged to operate upon digital input signals which are not differential in form, FIG. 5 corresponds to FIG. 4, but shows a modified form of the DAC capable of operating upon differential digital input signals, and, in response, to provide a stepped analogue output, also of differential form, FIG. 6 corresponds to FIG. 3, but is of the arrangement redrawn to illustrate the supply of reference voltages to current sources of the segmented DAC's, FIG. 7 is of the circuit whereby the differential analogue output from the appropriate DAC is applied to the Y deflection plates of the CRT, FIG. 8 is a block schematic diagram showing how the differential analogue output of one, Line DAC, of the arrangement of FIG. 3, is applied to integration means, before the outputs of the integration means are applied to the X deflection plates of the CRT, FIG. 9 corresponds to FIG. 3, but is of a modification thereof, including a further DAC, the arrangement being capable of compensating for a further form of distortion, such as the distortion associated with the CRT of FIG. 11, in addition to the distortion compensated for by the arrangement of FIG. 3, FIG. 10 corresponds to FIG. 6 but includes the further DAC of the arrangement of FIG. 9, and is equivalent to the arrangement of FIG. 9 re-drawn, FIG. 11 corresponds to FIG. 2, but is a plan view of a flat screen CRT with the electron gun assembly angularly displaced in relation to the longitudinal axis of symmetry of the CRT screen, a CRT display system including such a CRT requiring the arrangement in accordance with the present invention shown in FIGS. 9 and 10, FIGS. 12 and 13 correspond, respectively, to FIGS. 9 and 10, but are of an arrangement capable of compensating for, in addition, pin-cushion, or barrel, distortion and, FIG. 14 corresponds to FIG. 3, but is of the arrangement in accordance with the present invention in its most general form, having only the two DAC's generating the deflection signals.

The present invention relates to a cathode ray tube (CRT) display system, any required display being provided on a CRT screen by the electron beam scanning over the screen with a conventional raster scan pattern. For example, the CRT provided may be of the flat screen type of construction, in which case it is required that the provided raster scan pattern is coincident with, at least substantially, without distortion, having the same size, and shape, as the rectangular shaped CRT screen. Usually, the CRT is provided with electrostatic deflection plates. Such a CRT is described in British Patent Specification No. 1592571.

It is convenient to consider that, when the rectangular shaped CRT screen is viewed in plan, the X axis of the screen extends coincident with the longitudinal axis of symmetry of the screen, and the Y axis extends along the shorter axis of symmetry of the screen. Thus, when the appropriate potential differences, in the form of deflection signals, are applied across, what are considered to be, the X-deflection plates of the flat screen CRT the electron beam is caused to scan along raster lines parallel to the X axis of the screen, and when the appropriate potential differences, or deflection signals, are supplied across, what are considered to be, the Y deflection plates there are caused the successive raster scan lines in a raster scan frame, the raster scan lines being spaced from each other along the Y axis of the screen, and at right angles thereto, in a known manner.

There is shown in FIG. 1 the side elevation of a flat screen CRT, the side of the CRT envelope being omitted to show the CRT screen 10, an associated electron gun assembly indicated generally at 12, and deflection plates 14 and 16, of a flat screen CRT display system to which the present invention relates. These components are shown in an envelope 18. Also shown in FIG. 1 are typical electron beam paths, from the electron gun assembly 12, between the X deflection plates 14, to impinge on the screen 10, at uniformly spaced points along a raster scan line. The potential differences between the X deflection plates 14 control the displacement of the electron beam parallel to the X axis of the screen. The electron gun assembly 12 extends parallel to the screen plane, in a plane only displaced by a small distance from the screen plane. The Y deflection plates are indicated at 16, and the potential differences therebetween control the displacement of the electron beam parallel to the Y axis of the screen.

FIG. 2 corresponds to FIG. 1, but is a plan view of the CRT, the front of the CRT envelope 18 being omitted to show the CRT screen 10 in plan. As can be seen in FIG. 2, the electron gun assembly 12, when so viewed, extends coincident with an extension of the X axis, indicated at the left hand side (LHS) of the Figure, or the longitudinal axis of symmetry, of the CRT screen 10, the electron gun assembly being displaced laterally from the screen.

For a CRT display system not having a flat CRT screen construction, for example, as shown in FIGS. 1 and 2, it is conventional to provide the required raster scan pattern by applying deflection signals comprising linear-portion saw-tooth waveforms to the deflection plates, the desired saw-tooth waveforms being generated, possibly, solely by analogue means. Inherently with the construction of a flat screen CRT display system, as shown in FIGS. 1 and 2, if such linear-portion saw-tooth waveforms are applied to the deflection plates 14 and 16, a distorted raster scan pattern, having a truncated fluted shape, is provided in relation to the CRT screen, the longitudinal axis of symmetry of the flute shaped raster pattern being coincident with the X axis, or the longitudinal axis of symmetry, of the screen, as is desired. Such a truncated flute shaped raster scan pattern is shown in FIG. 2 superimposed upon screen 10 of the illustrated flat screen CRT.

In respect of a flat CRT screen display system, the required deflection signals to be supplied to the deflection plates 14 and 16, in order to cause the electron beam to scan in the required raster scan pattern, coincident with, at least substantially, free from distortion, having the same size, and shape, as the rectangular shaped CRT screen, in accordance with the present invention the deflection signals are generated by digital means including counters, and arranged to drive digital to analogue converters (DAC's).

In particular, it is convenient, as described below, if the digital means, and the DAC's to generate the required deflection signals to be supplied to the deflection plates 14 and 16, are arranged to operate upon digital differential signals. Each such digital differential signal has two constituent parts, on two leads, each constituent part comprising, individually, a voltage signal. Thus, there is a said one voltage signal of one sense, at one of two possible logic levels, and a said other voltage signal, at the other of the two possible logic levels, in relation to what is considered to be the associated logic threshold mid-way therebetween. Said other voltage signal is considered to be complementary to said one voltage signal, although the associated pair of signals may not be at the same potential, but of opposite sense. Said other voltage signal may be of the same sense as, but of a lower potential than, said one voltage signal, in relation to zero potential; or vice versa. The corresponding differential signal comprises the difference between the potentials of the associated pair of voltage signals. The logic threshold associated with the digital differential signal, if not zero potential, is considered to be the common mode voltage associated with the differential signal.

For each digital differential signal a logic "0" is provided by one constituent voltage signal of the differential signal being negative, and the other constituent voltage signal being positive, or said one voltage signal being more negative than said other constituent voltage signal, and a logic "1" is provided by said one voltage signal being positive, or more positive than said other voltage signal; or vice versa.

For convenience, herinafter in this specification, and the accompanying claims, digital differential inputs and outpus of constituent portions of the CRT display system to which the present invention relates are referred to, each such digital differential input, or output, being considered as providing a series of discrete differential signals to be operated upon in the required manner within the display system. In relation to each such differential input there is a pulse repetition rate associated with possible changes in the logic levels, a constituent differential input signal, of the series of differential input signals, being considered as being provided, corresponding to each consecutive pulse from a clock pulse generator, or oscillator, at the pulse repetition rate associated therewith, the oscillator being included in the display system to control the operation of the associated portion of the system. In relation to each differential output from a constituent portion of the display system, there is considered to be provided a series of differential output signals, each such differential output signal being provided in response to a simultaneous differential input signal, or signals, to the portion, and operated upon therein. There are logic levels associated with digital differential outputs, and the differential output logic levels may not be the same as the differential input logic levels.

Similarly, it is known to provide differential digital signals to drive DAC's, and it is known that the stepped, analogue outputs from the DAC's, for example, driven by the digital means referred to above, are of such a differential form, although not having any logic levels associated therewith. The centre potential of each constituent analogue signal, or step, considered to be discrete, within such a stepped differential analogue output, and corresponding to a simultaneous discrete, differential, digital input signal, or signals, to the associated DAC, is considered to be the common mode potential of the differential analogue output signal. The magnitude associated with a differential analogue output signal is represented by the potential difference between the constituent parts of the differential analogue output signal.

A general scheme of such digital means, driving DAC's to cause the generation of the required raster scan pattern, in accordance with the present invention, is shown in FIG. 3.

An oscillator 30, of a known construction, provides pulses, at a constant pulse repetition rate O to a divide by N counter 31, which in turn provides pulses, at a rate O/N, to a divide by M counter 32. Each counter 31 or 32 comprises a ripple-through shift register, arranged to operate upon differential pulses, or signals, supplied thereto from the oscillator 30. Conveniently, it can be considered that in the required raster scan pattern each raster scan line has N pixel points, and that there are M raster scan lines in the pattern. Hence, if the desired display refresh rate is once per second, the required oscillator pulse repetition rate O is N.M Hertz. If the desired display refresh rate is a multiple D per second, the pulse repetition O of the oscillator is D.M.N Hertz, and the counter 32 receives pulses at the rate D.M Hertz.

For each counter 31 and 32, when considered from the start of their operations, and in response to the receipt of each oscillator pulse, a corresponding multi-bit digital signal is provided in parallel form from the counter, a different digital signal being provided in response to the receipt by the counter of the different pulses. When the counter 31 has received N pulses from the oscillator 30, or when the counter 32 has received M pulses from the counter 31, the counter resets, and in the case of the counter 31, provides a pulse to the counter 32. Thus, there is an operating cycle associated with each counter 31 or 32, the period of each repetitive operating cycle for the counter 31 being at least equal to a required raster line scan period (t), and the period of each repetitive operating cycle for the counter 32 being at least equal to a required raster frame scan period (T). Further, successive oscillator pulses received by the counter 31 correspond to successive pixels in the raster scan lines, so that in each repetitive operating cycle of the counter, the successive N differential digital signals therefrom, as N oscillator pulses are supplied successively to the counter, represent the successive pixels on a raster scan line, and, in particular are capable of representing the successive pixel positions in the raster scan line. Similarly, for an undistorted raster scan pattern, successive pulses received by the counter 32 correspond to successive raster lines in the raster frames, so that in each repetitive operating cycle of the counter, the successive M differential digital signals therefrom, as M pulses are supplied successively to the counter, represent the successive raster scan lines in a raster frame, and, in particular, are capable of representing the successive raster line positions in the raster frame.

Each series of differential digital signals from the counter 31, in an operating cycle of the counter, is supplied to a DAC 34 arranged to provide, in response, an appropriately stepped, differential, analogue current output, to cause the provision of corresponding deflection signals to be supplied to the X deflection plates 14 in a raster line scan period (t), to cause the straight raster line scan, of an undistorted raster scan pattern, to be produced. As stated above, successive differential digital DAC input signals represent successive pixel positions along the raster scan line, the pixel positions being required to be uniformly spaced along the raster line, and hence parallel to the X axis, or the longitudinal axis of symmetry of the CRT screen 10. Similarly, each series of differential digital signals from the counter 32, in an operating cycle of the counter, is supplied to a DAC 36 arranged to provide, in response, an appropriately stepped, differential, analogue current output, to cause the provision of corresponding deflection signals to be supplied to the Y deflection plates 16 in a raster frame scan period (T), for an undistorted raster scan pattern. As stated above, successive differential digital DAC input signals represent successive straight raster scan line positions within the raster frame, the raster line positions being required to be uniformly spaced along the Y axis, or the shorter axis of symmetry of the CRT screen 10.

It is convenient to refer to the counter 31 as the Line counter, associated with the X axis of the required raster scan pattern, and to refer to the counter 32 as the Field counter, associated with the Y axis of the required raster scan pattern.

If there are to be between 64 and 128 pixel positions is each raster scan line, the binary number N, associated with the Line counter 31 is required to be 128, the Line counter 31 provided being a seven-bit counter. Similarly, if there are to be between 256 and 512 raster scan lines in each raster scan frame, the binary number M, associated with the Field counter 32 is required to be 512, the Field counter 32 provided being a nine-bit counter.

In response to each pulse from the oscillator 30, a corresponding, parallel, seven-bit digital signal, of differential form, is provided from the Line counter 31, both to the DAC 34, designated the Line DAC, and to a DAC 35, designated the Field Correction DAC. Each differential digital signal from the Line counter 31 is representative of the number of pulses instantaneously stored in the Line counter. Similarly, in response to each pulse received by the Field counter 32, a corresponding, parallel, nine-bit digital signal, of differential form, is provided from the Field counter 32 to the DAC 36, designated the Field DAC, and each such differential digital signal is representative of the number of pulses instantaneously stored in the Field counter 32.

The corresponding, differential, appropriately stepped analogue current output from the Line DAC 34 is shown as being provided on two leads 37, and is to cause the corresponding appropriate voltage deflection signals, to be applied to the X deflection plates 14, the leads 37 being connected individually to the X deflection plates 14. Similarly, the corresponding, differential, appropriately stepped analogue current output from the Field DAC 36 is shown as being provided on two leads 38, to cause the corresponding appropriate voltage deflection signals, to be applied to the Y deflection plates 16, the leads 38 being connected individually to the Y deflection plates 16.

For convenience, and as indicated at the LHS of FIG. 2, the centre of the LHS of the CRT screen 10 is considered to be the origin of both the X and Y axes associated with the screen, the positive and negative portions of the axes extending in their usual directions.

When the electron beam is required to impinge on the centre raster line of the raster scan pattern, coincident with the X axis, and with the associated Y axis value being zero, the common mode voltage of the differential analogue signal applied to the Y deflection plates 16 is required to have an appropriate high positive value. The difference between the potentials of the Y deflection plates 16 is zero. Differences between the potentials of the Y deflection plates 16 cause corresponding deflections of the impingement point of the electron beam on the CRT screen parallel to the Y axis. The electron beam being negatively charged, requires the potential differences associated with the differential analogue signals to be applied to the Y deflection plates 16 to be such that the upper Y deflection plates, as shown in FIG. 2, is at a greater positive potential than the positive potential of the lower Y deflection plate, for the electron beam to impinge upon a raster line in the upper part of the CRT screen 10, with the associated Y axis value being positive. Consequently, because the upper part of the CRT screen 10 corresponds to the positive going part of the Y axis, such a potential difference is referred to as being positive, and the corresponding differential analogue signal to be applied to the Y deflection plates is referred to as being positive. Similarly, when the electron beam is required to impinge upon a raster line in the lower part of the CRT screen 10, with the associated Y axis value being negative, the upper deflection plate is required to be at a smaller positive potential than the positive potential of the lower Y deflection plate. The corresponding potential difference is referred to as being negative, and the corresponding differential analogue signal to be applied to the Y deflection plates is referred to as being negative.

However, when the electron beam is required to impinge on the Y axis of the CRT screen, with the associated X axis value being zero, as is apparent from FIG. 1, the corresponding common mode potential of the differential, analogue signal applied to the X deflection plates 14 is required to have an appropriate high positive value, but the potential of the lower X deflection plate, as shown in FIG. 1, is more positive than the potential of the upper X deflection plate. For convenience, this potential difference is considered to be zero, corresponding to the X axis value being zero. Further, for the electron beam to impinge upon the CRT screen 10, with the associated X axis value being positive, the potential of the lower X deflection plate is required to be even more positive, in relation to the potential of the upper X deflection plate, than when the electron beam impinges on the Y axis, and, in this case, the potential difference is referred to as being positive, and the corresponding differential analogue signal to be applied to the X deflection plates is referred to as being positive. Similarly, if the potential of the lower X deflection plate is required to be less positive, in relation to the potential of the upper X deflection plate, than when the electron beam impinges on the Y axis, and, in this case, the potential difference is referred to as being negative, and the corresponding differential analogue signal to be applied to the X deflection plates is referred to as being negative.

Ignoring, initially, the Field Correction DAC 35, and assuming, initially, that both the Line DAC 34 and the Field DAC 36 operate in accordance with appropriate linear functions, if the differential, linearly varying analogue output from the Line DAC causes corresponding deflection signals to be applied to the X deflection plates of a conventional CRT display system, not having a flat CRT screen type of construction, and the differential, linearly varying analogue output from the Field DAC causes corresponding deflection signals to be applied to the Y deflection plates, of such a conventional CRT display system, without any distortion of the raster pattern associated therewith, it can be arranged that the required rectangular shaped raster scan pattern is provided thereby. However, if such a differential, linearly varying analogue output from the Line DAC 34, and from the Field DAC 36, cause corresponding deflection signals to be supplied, respectively, to the X deflection plates 14, and to the Y deflection plates 16, of a flat screen CRT display system, as described above, the truncated, flute shaped raster scan pattern, shown in FIG. 2, is produced thereby.

In order to modify the truncated, flute shaped raster scan pattern, capable of being produced by the arrangement of FIG. 3 in the manner described above, within this arrangement the Field Correction DAC 35 is provided, and the Field Correction DAC is to operate in accordance with a desired non-linear function, uniformly for each raster scan line, in response to the series of differential digital signals from the Line counter 31. As described in greater detail below, the Line DAC 34 is also required to operate in accordance with a non-linear function, but initially it can be considered to be a DAC operating in accordance with a linear function. The Field DAC 36 is required to operate in accordance with an appropriate linear function, also as described in greater detail below, and in response to the series of differential digital signals from the Field counter 32. A required interaction between the non-linear output of the Field Correction DAC 35 and the manner of operation of the Field DAC 36 is indicated, generally, by a lead 39 therebetween, shown in FIG. 3. The combined manner of operation of the interacting Field Correction DAC 35 and the Field DAC 36 represent a function, representing corresponding variations of the non-linear differential, analogue Field DAC output required, to cause there to be applied to the Y deflection plates 16, appropriate differential deflection signals to correct the distorted, flute shaped raster scan pattern, otherwise produced, in relation to the X axis of the CRT screen 10.

Because, as indicated above, the differential, appropriately stepped analogue current outputs from the Line DAC 34 and the Field DAC 36 are to cause corresponding appropriate voltage deflection signals to be applied, respectively, to the X deflection plates 14, and the Y deflection plates 16, it is convenient to consider subsequently in this specification that the Line DAC and the Field DAC supply the required voltage deflection signals direct to, respectively, the X deflection plates, and the Y deflection plates. The required, differential voltage deflection signals $V_x$ are indicated as being supplied on the two leads 37 from the line DAC 34; and the required, differential voltage deflection signals $V_y$ are indicated as being supplied on the two leads 38 from the Field DAC 36.

Each of the DAC's 34, 35 and 36, conveniently, has the so-called segmented DAC type of construction. Whilst this form of construction is optional in the case of a DAC operating in accordance with a linear function, such as the Field DAC 36, it is desirable that each DAC operating in accordance with a desired non-linear function, such as the Field Correction DAC 35, has the segmented DAC form of construction, because this form of construction, described in detail below, is suitable to be adapted readily to operate in accordance with a desired non-linear function.

Shown in FIG. 4 of the accompanying drawings is a known form of seven-bit, segmented DAC, initially considered to be linear in operation, and initially considered to be arranged to operate on input signals which are not differential in form, and, in response, to produce a corresponding stepped analogue output which is not differential in form. A set of four most significant bits (MSB's) of each digital input signal to the converter, from say the Line counter 31, is provided to a switching matrix, indicated generally within a dotted line 40. Each set of four MSB's is representative of a digital value comprising a multiple (p) of a predetermined binary number (q), (p) having any integral value, including zero, and upto a maximum possible value of $(N'-1)$, $N'$ being equal to sixteen, and (q) being eight. $N'$ substantially identical current sources, each indicated generally at 42, and comprising an NPN transistor T1 and a resistor R1, are corrected to the switching matrix 40. The current sources 42 each have an output (i), shown as entering each source, and considered as representing the predetermined binary number (q).

The ($N'$) sources 42 are connected in parallel to the switching matrix 40. The bases of the transistors T1 are connected to a common rail 43, the collectors are connected to the switching matrix 40, and each of the emitters is connected individually to one end of the associated resistor R1. The other end of each resistor R1 is connected to a common rail 44. The current (i) flows in the collector circuit of each transistor T1.

In response to the receipt by the switching matrix 40 of a set of MSB's, the corresponding number (p) sources 42 are connected to the converter output solely via the switching matrix, and at the converter output there is provided a summed current $I_o'$, which is zero when (p) is zero, and comprises at least part of the corresponding analogue output signal from the converter. A first, or a further, source 42 is connected to the converter output via both the switching matrix and a subdivision system, indicated generally at 45. The subdivision system 45 comprises a known, non-segmented, form of digital to analogue converter (DAC), and usually includes an R-2R network of resistors. The sets of three least significant bits (LSB's) of the digital input signals to the converter, from the Line counter 31, are provided to the subdivision system 45. In response to each set of LSB's the magnitude of the current (i), supplied by the aforesaid source connected thereto, is reduced at the output of the subdivision system, to provide an analogue signal representing the digital value represented by the set of LSB's. The magnitude represented by the analogue signal provided at the output of the subdivision system 45 can have any integral value, including zero, and upto, but not including, the predetermined binary number (q), and instead of representing the predetermined binary number (q). At the converter output, the output of the subdivision system 45 is combined with the summation $I_o'$ of any source outputs supplied thereto solely via the switching matrix 40, so that the anlogue output signal $I_o$ from the converter represents the value represented by the whole of the instantaneous digital input signal to the converter.

In the case when the DAC is not arranged to operate upon differential signals, as illustrated in FIG. 4, when a source 42 is not connected to either the converter output, or the subdivision system, the current therefrom is supplied to a sump, not shown, comprising a low impedance load.

If the operation of the segmented converter, and in particular the connection of the sources to the subdivision system 45, is considered, in response to the receipt of the sets of MSB's supplied to the switching matrix 40, there is an order position for each source 42 within the sequence in which the sources are connected to the subdivision system, as the values represented by digital input signals to the converter increase continuously from zero. The sources in the lower order positions in the sequence to that of the source instantaneously connected to the subdivision system 45, simultaneously, are connected to the converter output solely via the switching matrix. It is convenient to consider that each of the sources individually, and respectively, within the sequence, represent (p) being zero, and, incrementally, each integral value from unity up to (N'−1), corresponding to the connection of the sources solely to the converter output.

Also for convenience, the switching matrix 40 is considered as including N' bipolar, or three-way, switches 47, of any convenient form. For a DAC arranged to operate upon differential signals three way switches 47 are required. The collectors of the transistors T1 of the current sources 42 are connected individually to an associated predetermined one of the bipolar switches 47. In the sequence referred to in the preceding paragraph, the bipolar switches have order positions which correspond individually to the order positions of the sources 42 connected thereto.

The bipolar switches 47 are shown as being actuated by signals from decoding means, of the switching matrix 40, and indicated generally at 48, the decoding means having N' outputs, each output being connected individually to a bipolar switch. Each output of the decoding means can be considered as corresponding to the set of MSB's which causes there to be provided at the output a signal of a first of two possible forms, to close in the first of two possible ways, individually, the associated bipolar switch, to cause the associated source to be connected to the subdivision system. Consequently, there is a sequence of sets of MSB's corresponding to the sequence of sources, and to the sequence of bipolar switches. The order positions of the sets of MSB's within the sequence correspond individually, and respectively, to the order positions of the sources in the corresponding sequence. These sets of MSB's within the sequence represent, respectively, (p) being zero, and, incrementally, each integral value from unity up to (N'−1). However, when considering each of the sources individually, and respectively, within the sequence with (p) being, in turn, zero, and, incrementally, each integral value from unity upto (N'−1), as referred to above, each of the sources of lower order than the source instantaneously connected to the subdivision system, simultaneously are connected to the converter output solely via the switching matrix. This is in response to the receipt, from corresponding outputs of the decoding means, of signals of the second of the two possible forms, to close the corresponding bipolar switches in the second of the two possible ways.

When the bipolar switches are open, the current outputs of the associated sources are supplied to the sump.

There is shown the ninth bipolar switch 47' closed in the first way, to connect the associated source to the subdivision system 45, in response to the receipt by the decoding means of the appropriate set of MSB's. The sources having the lower order positions in the sequence referred to above, simultaneously, are connected to the converter output solely via the switching matrix. In particular, they are connected to the converter output by the associated bipolar switches being closed in the second of the two possible ways, in response to signals of the second of the two possible forms, respectively, on the associated outputs of the decoding means, preceding the output connected to the bipolar switch 47', closed in the first of the two possible ways, in the predetermined sequence of outputs. Such output signals of the second form are provided by logic means within the decoding means, automatically in response to the receipt by the decoding means of the instantaneous set of MSB's causing the output connected to the bipolar switch closed in the first of the two possible ways.

Thus, there is associated individually with each set of MSB's a corresponding analogue output signal value $I_o'$, of the plurality of different possible analogue output signal values, represented by the different multiples (p) of the output current (i) of each source 42. Further, there is associated with each digital signal considered as a whole, and from the counter 31, a corresponding analogue output signal value $I_o$, represented by the summation of the appropriate multiple (p) of the output current (i) of each source 42, and the current representative of the binary number (q), represented by the set of LSB's instantaneously supplied to the subdivision system 45.

For a segmented DAC, such as the one described above, to operate in accordance with a predetermined non-linear function, conveniently, the resistors R1 in the current sources 42 are not identical, but have different predetermined magnitudes, the relationship between successive resistors R1 of the series being in accordance with the predetermined non-linear function.

If the first constituent raster line scan of the distorted, flute shaped raster scan pattern, described above, is considered, with the start of the raster line being coincident with the top left hand corner of the CRT screen 10, the potential differences of the differential analogue signals $V_y$ applied to the Y deflection plates 16 are required to increase throughout the first raster line scan period (t) in a predetermined non-linear way, to be represented by the desired non-linear function associated with the segmented Field Correction DAC 35. The predetermined non-linear way in which the potential differences $V_y$ applied to the Y deflection plates vary are to cause the first raster line scan to be parallel to the X axis of the CRT screen 10, instead of being curved. Thus, the desired non-linear function in accordance with which the Field Correction DAC 35 is required to operate over the first raster line scan period (t) is the inverse of the non-linear function representing the curved, uncorrected first raster line scan in relation to the X axis of the CRT screen 10. Now assume that the potential differences $V_y$ applied to the Y deflection plates cause the corrected, straight, first raster line to have its required location at the top of the CRT screen 10. Then the potential differences $V_y$, varying non-linearly over the raster line scan period (t) in the same way as for the first raster line, in relation to each raster line considered as a whole, and to cause each of the other raster lines to have their required locations along the Y axis of the CRT screen, are required to differ from each other by a variable, stepped, scaling factor, over the raster frame scan period (T), each constituent step having the duration of a raster line scan period (t). Thus, conveniently, the variable scaling factor is represented by the appropriate linear function, referred to above, in accordance with which the Field DAC 36 is required to operate over the raster frame scan period (T), the Field counter 32, driving the Field DAC, being, in turn, driven by pulses from the Line counter 31, one such pulse being provided in each raster line scan period (t).

Required compensating increases in the potential differences of the differential analogue signals $V_y$ applied to the Y deflection plates 16 are to increase the deflection of the electron beam parallel to the Y axis of the screen in the positive sense when the electron beam is displaced parallel to the Y axis in the positive sense, and are to increase the deflection of the electron beam parallel to the Y axis of the screen in the negative sense when the electron beam is displaced parallel to the Y axis in the negative sense. For the raster scan line period (t) at exactly half-way through the raster frame scan period (T), when the corresponding raster scan line is coincident with the X axis of the screen, both in the desired rectangular raster scan pattern, and in the distorted, flute shaped raster scan pattern, no correcting increase of the deflection of the electron beam parallel to the Y axis, and of either sense, is required.

The appropriate combination of the predetermined non-linear function, uniform for each raster line scan period (t), in relation to the potential differences $V_y$ of the differential analogue signals required to be applied to the Y deflection plates 16, and the appropriate linear function representing variations of the potential differences $V_y$ of the differential analogue signals required to be applied to the Y deflection plates 16 over a raster frame scan period (T), comprises a function which is the inverse of the function capable of representing the distorted, flute shaped raster scan pattern in relation to the X axis of the screen, and is representative of the compensating potential differences $V_y$ of differential analogue signals required to be applied to the Y deflection plates in order to correct the flute shaped distortion, and to obtain the desired rectangular raster scan pattern.

Initially ignoring the variable scaling factor, the potential differences $V_y$ of differential signals applied to the Y deflection plates 16 are to increase in the predetermined non-linear way, to be represented by the desired non-linear function associated with the manner of operation of the Field Correction DAC 35, uniformly for each constituent raster line scan period (t) of the raster pattern, and the Field Correction DAC is required to be driven by differential digital signals from the Line counter 31. As indicated in FIG. 3, the non-linear variation of the differential analogue signals $V_{y1}$ from the Field Correction DAC, over each raster line scan period (t), and representative of corresponding non-linear variations in the potential differences $V_y$ of differential analogue signals to be applied to the Y deflection plates 16, can be represented by a graph, the shape of which graph is the inverse of the shape of the first raster line otherwise obtained in relation to the X axis of the CRT screen 10. Thus, the differential signals $V_{y1}$ vary, in the predetermined non-linear way, from representing zero to a maximum positive value over the raster line scan period (t).

The Field Correction DAC 35 operates in accordance with the predetermined non-linear function by the successive resistors R1 in the current sources 42 having different predetermined magnitudes, the relationship between successive resistors of the series being in accordance with the predetermined non-linear function, and the desired resistances may be determined in an empirical manner. The Field Correction DAC 35 is a seven-bit DAC, driven by digital signals from the seven-bit line counter 31, there being between 64 and 128 constituent pixels in each raster scan line. Conveniently, the segmented Field Correction DAC 35 has sixteen constituent segments, or current sources 42, so that there are sixteen groups of constituent steps in the stepped analogue output from the Field Correction DAC, within each group of steps there being eight uniform steps, there being non-uniform variations only between each group of steps, each group being considered as a whole. The arrangement adequately represents the required non-linear function.

The constituent function, of the combined function referred to above, the constituent function representing variations of the potential differences $V_y$ required to be applied to the Y deflection plates 16 over a raster frame scan period (T), and comprising the appropriate stepped linear function, conveniently, to be represented by the required manner of operation of the Field DAC 36, requires the Field DAC to be driven by differential digital signals from the Field counter 32.

In particular, as indicated in FIG. 3, it is required that the appropriate linear function in accordance with which the Field DAC 36 is required to operate, when considered alone, is such that the compensating potential differences $V_{y2}$, of differential analogue signals from the Field DAC, over any raster frame scan period (T), causes, when supplied to the Y deflection plates 16, an electron beam deflection which is zero half way through the raster frame scan period (T). The electron beam deflection decreases linearly in the first half of the raster frame scan period, from a maximum positive value for the first raster line scan, and increases linearly in a negative sense in the second half of the raster frame scan period, having a maximum negative value for the final raster line scan, equal in magnitude to the maximum positive value for the first raster line scan. Thus, the shape of the graph of the potential differences $V_{y2}$ over the raster frame period (T) is a straight line having a predetermined negative slope, and comprises a representation of the appropriate linear function in accordance with which the Field DAC 36 is required to operate, and of the variable scaling factor referred to above.

The variable scaling factor, or the appropriate linear function, to be introduced by the Field DAC 36, is inherently introduced by the successive equal resistors R1 in the current sources 42 of the Field DAC 36. The Field DAC 36 is, at least, a nine-bit DAC, driven by digital signals from the nine-bit Field counter 32, there being between 256 and 512 constituent raster lines in each raster frame. Conveniently, the segmented Field DAC 36 has sixteen constituent segments, or current sources 42, each corresponding to a small multiple of the constituent raster lines in the raster scan pattern. Each of the 512 constituent steps of the stepped differential analogue output from the Field DAC 36 is uniform, as is required.

FIG. 5 corresponds to FIG. 4 but shows the arrangement of a nine-bit, segmented DAC in greater detail. In particular, the DAC shown in FIG. 5 is the Field DAC 36, and unlike the DAC shown in FIG. 4, is shown in a form suitable to receive digital differential signals from the Field counter 32, and, in response, to provide a corresponding stepped analogue output which is differential in form.

Each three-way switch 47 comprises three bipolar transistors T2, with their emitters connected to the associated current source 42. The bases of the transistors T2 are connected to the decoder 48 (not shown in FIG. 5), to receive signals therefrom. In FIG. 5, one discrete part of such a decoder output is designated S1, another part S2, and the third part S3, a signal from each such part being capable of being supplied, individually, to one of the three transistors T2. There are three such constituent parts S1, S2 and S3 for each decoder output, connected individually to the sixteen switches 47. The collector of each transistor T2 associated with a decoder output part S1 is connected to one input 50 of a differential amplifier 01; and the collector of each transistor T2 associated with a decoder output part S2 is connected to the other input 51 of the differential amplifier. The collector of each transistor T2 associated with a decoder output part S3 is connected to one end of the five-bit R-2R ladder network 45 of the subdivision means 45. Each of the thirty-two stages of the R-2R ladder network is connected, individually, to a two way switch 52, and comprising two bipolar transistors T3, with their emitters connected to the associated stage of the ladder network. The bases of the transistors T3 are connected, individually, to output parts L1 and L2, from each of the LSB stages of the Field counter 32, to receive signals therefrom. The collector of each transistor T3 associated with a counter output part L1 is connected to the same input 50 of the differential amplifier 01 as each transistor T2 associated with a counter outut part S1. The collector of each transistor T3 associated with a counter output part L2 is connected to the same input 51 of the differential amplifier 01 as each transistor T2 associated with a decoder output part S2. There are two such constituent parts L1 and L2 for each of the LSB stages of the Field counter 32. Two signals are received simultaneously by each switch 52 from each associated pair of counter output parts L1 and L2, and together comprise a digital differential signal from the corresponding LSB counter stage. The end of the ladder network 45 remote from the connection to the transistor T2 associated with the decoder output part S3, is connected to a rail 50 maintained at a supply potential V2, via a diode D1. The two inputs of the differential amplifier 01 are also connected to the rail 53, by resistors R2. The two outputs of the differential amplifier 01 comprise the leads 38, on which are provided the two parts of the differential signals $V_{y2}$, from the Field DAC 36, and comprising a factor of the differential $V_y$ to be applied to the Y deflection plates 16.

In operation, if the ninth switch 47' is considered, and connects the associated current source 42 to the subdivision system 45, as in the arrangement of FIG. 4, a signal is provided from the associated output part S3 of the decoder 48, and the appropriate transistor T2 is rendered conducting. Instantaneously, appropriate LSB stages from the Field counter 32 each provides a signal from the corresponding counter output parts L1, to the corresponding switches 49, and, in particular, the appropriate transistors T3 connected to said one input 50 of the differential amplifier 01 are rendered conducting, by the signals, from the associated counter output parts L1, being supplied to the bases thereof.

All the decoder output parts S1 of decoder outputs of lower order in the sequence of such decoder outputs than the ninth, each supply a signal to the transistor T2 connected thereto, to render these transistors T2 conducting, and a current $I_o'$ flows into these current sources. Because of the appropriate transistors T3 of the switches 52 also being rendered conducting, by signals from counter output parts L1, current also flows through the subdivision means 45 to the ninth current source, the total current flowing from said one input 50 of the differential amplifier 01 being $I_o$.

Simultaneously, all the decoder output parts S2 of decoder outputs of higher order in the sequence of such decoder outputs than the ninth, each supply a signal to the transistor T2 connected thereto, to render these transistors T2 conducting, and a current $\underline{I_o}'$ flows into these current sources. Two signals are received simultaneously by each switch 47, except the switch 47' receiving a signal from a decoder output part S3, from the associated pair of decoder output parts S1 and S2, and together comprise a digital differential signal therefrom. The transistors T3 of the remaining switches 52, not receiving signals from the counter output parts L1, are also rendered conducting, by signals from counter output parts L2, and a current also flows through the subdivision means 45 to the ninth current source. The total current flowing from said other input 51 of the differential amplifier 01 is $\underline{I_o}$.

It will be appreciated that $I_o + \underline{I_o}$ is equal to the instantaneous total current flowing through the DAC, but is not a constant.

The arrangement is such that the differential output $V_{y2}$ from the differential amplifier 01 is proportional to the instantaneous value for $(I_o - \underline{I_o})$. At the start of each operating cycle of the Field counter 32, $I_o$ has its maximum value, and $\underline{I_o}$ is zero. Hence, the differential output $V_{y2}$ has its maximum positive value, as required. The value for $V_{y2}$ then falls steadily, until, half way through the operating cycle, at a time (T)/2, $I_o = \underline{I_o}$, and the value for $V_{y2}$ is zero, as required. Then $\underline{I_o}$ becomes greater than $I_o$, and the differential output $V_{y2}$ goes negative. The negative value of $V_{y2}$ rises steadily through the second half of the operating cycle of the Field counter 32, until, at the end of the operating cycle, at a time (T), $I_o$ is zero, and $\underline{I_o}$ has its maximum value, equal to the maximum value of $I_o$ at the start of the operating cycle. At this time (T) the differential output $V_{y2}$ has its maximum negative value, equal in magnitude to its maximum positive value, as required.

In addition to the magnitudes associated with the analogue output of such a linear, or non-linear segmented DAC varying in accordance with the values represented by differential digital input signals thereto, the analogue output magnitudes also vary in accordance with changes in the reference voltage V1, shown in FIGS. 4 and 5, applied between the rails 43 and 44 connected, respectively, to the bases of the transistors T1 of the constant current sources 42, and the ends remote from the transistors T1 of the resistors R1 of the current sources, of the DAC.

The required interaction of the differential analogue output of the non-linear Field Correction DAC 35 with the operation of the linear Field DAC 36, in the appropriate manner, is obtained by arranging that the reference voltage V1', applied between the rails 43 and 44 of the Field DAC, varies with the non-linear analogue output of the Field Correction DAC, as indicated by the provision of the lead 39 in FIG. 3. In particular, the differential analogue output $V_{y1}$ of the Field Correction DAC 35 is provided on two leads, but, for convenience, only one such lead 39 is shown in FIG. 3. One lead is connected to the rail 43 of the DAC, and othe other lead is connected to the rail 44 of the DAC. However, as stated above, in representing the required factor of the differential analogue signal $V_y$ to be applied direct to the deflection plates, the corresponding differential output $V_{y1}$ from the Field Correction DAC is required to vary in a non-linear way only between representing zero, and a maximum positive value. Hence, it is convenient to arrange that the potential supplied to the rail 44, connected to the resistors R1 of the current sources of the Field DAC 36, and comprising one constituent part of the differential output, is always zero, and only the potential on the rail 43, connected to the bases of the NPN transistors T1 of the current sources of the Field DAC, and comprising the other constituent part of the differential output, varies, only between zero, and a maximum positive value. Thus, the gain of the Field DAC 36 is caused to vary in accordance with the non-linear differential output of the Field Correction DAC 35. Hence, the analogue output of the linear Field DAC is not linear, and is in accordance with the combined function, representing non-linear variations of the compensating potential differences $V_y$ required to be applied across the Y deflection plates 16 in order to correct the distorted, flute shaped raster scan pattern, otherwise obtained.

In particular, and again intially ignoring the variable scaling factor, $V_{y2}$, associated with the Field DAC 36, it is required that at any instant within the first raster line scan period (t), considered individually, within a raster frame scan period (T), the varying reference voltage V1' applied between the rails 43 and 44 of the Field DAC 36, as the variable gain thereof, is given by the expression:

$$V1' = V1 + V_{y1}$$

where V1 is the constant output voltage of a reference source. The instantaneous voltages V1' applied between the rails 43 and 44 of the Field DAC are those required to provide the required straight raster scan line paallel to the X axis of the CRT screen. At the start of the raster line scan period V1' has the value of V1. At the end of the raster line scan period, V1' has its maximum possible value, and the instantaneous reference voltage V1' applied between the rails 43 and 44 of the Field DAC, at any instant in the raster line scan period (t), and comprising the variable gain of the Field DAC, as is required, is arranged to compensate for the curved raster line, otherwise obtained.

At the output of the Field DAC 36 the above expression is modified to include the variable scaling factor, $V_{y2}$, in the following manner:

$$Y_y = V_{y2}(V1 + V_{y1})k$$

where $V_{y2}$ is represented by the appropriate linear function in accordance with which the Field DAC operates over the raster frame scan period (T), varying between a maximum positive value, and an equal negative value; and k is a constant, equal to the reciprocal of the maximum value for $V_{y2}$. Thus, each constituent raster line of the raster scan pattern is straight in form, and each has its required location along the Y axis of the CRT screen 10. Hence, the different constituent portions, or steps, of the stepped analogue output $V_y$ from the Field DAC, the portions being considered as being discrete, are capable of causing, individually, each constituent raster line of a raster pattern.

The variations of the differential output $V_{y1}$ from the Field Correction DAC 35, and applied between the rails 43 and 44 of the current sources 42 of the Field DAC, do not adversely affect the manner of operation of the Field DAC, by causing corresponding, and undesired, variations in the currents $I_o$ and $I_o$ flowing in relation to the differential amplifier 01, and only cause the desired variations in the gain of the Field DAC. This is because the Field DAC is arranged to operate upon digital differential signals, and, in response, to provide a differential, analogue output.

Alternatively, the arrangement of FIG. 3 may be such that the first raster line scan, of the distorted flute shaped raster scan pattern, intersects the top right hand corner of the CRT screen 10, instead of the top left hand corner of the screen as shown in FIG. 2. Consequently, the function representative of the non-linear output of the Field correction DAC 35, at the start of each operating cycle of the Line counter 31, has a maximum positive value, and falls steadily to zero, at the end of the Line counter operating cycle. The function representative of the linear output of the Field DAC 36 is required to have a positive slope, having a maximum negative value at the start of each operating cycle of the Field counter 32, and a maximum positive value at the end of the operating cycle, and zero value midway therebetween.

FIG. 6 corresponds to FIG. 3, except that the oscillator 30, and the connection between the Line counter 31 and the Field Divider 32, are omitted for the sake of clarity. Further, the arrangement has been redrawn to show how the constant reference voltage V1 is applied to each of the DAC's 34, 35 and 36, and in particular how the reference voltage V1' to the Field DAC 36 is caused to vary in the required manner in response to the non-linear analogue output $V_{y1}$ of the Field Correction DAC 35, in order to provide the required interaction between these two DAC's, indicated generally by the provision of the lead 39 in FIGS. 3 and 6. For convenience, the reference voltages to the DAC's 34, 35 and 36 are not shown as being differential in form, but each such reference voltage is of differential form.

In relation to FIG. 6, a common reference voltage source is indicated generally at 60, the constant output V1 therefrom being shown as being connected directly both to the Line DAC 34, and to the Field Correction DAC 35, and is shown as being connected to the Field DAC 36 via a known form of summing means indicated generally at 62. The varying analogue output $V_{y1}$ of the Field Correction DAC 35 is supplied to a positive input of the summing means 62, and is considered as providing the required compensating voltage indicated above, to be added to the constant output V1 of the reference voltage source 60 before the correspondingly varying reference voltage V1' is supplied to the Field DAC 36.

Attenutation means, not shown, may be provided between each DAC 34, 35 and 36, and the common voltage source 60, so that the appropriate reference voltages to cause a raster scan pattern of the same size, and shape, as the CRT screen 10 to be produced.

A suitable form of interface circuit between the output leads 38 from the Field DAC 36, carrying the analogue differential output from the DAC, and the Y deflection plates 16, is shown in FIG. 7. Each lead 38 is connected, individually to the base of a bipolar transistor T4. The collector of each transistor T4 is connected to a rail 70 maintained at the extra high voltage $V_{EHT}$ associated with the CRT, via a resistor R3. The Y deflection plates 16 are connected, individually, to a point 71 between a transistor T4 and the associated resistor R3, in order to have the differential signals from the Field DAC superimposed upon a desired, high common mode potential, corresponding to $V_{EHT}$, at the Y deflection plates 16. In order for the circuit to have an appropriate minimum gain, the emitter of each transistor T4, individually, is connected to a rail 72 maintained at zero potential, respectively, via a resistor R4. The minimum gain is then controlled by the ratio R3/R4. Connected in parallel with each other, between the points 73 between each transistor T4 and the associated resistor R4, is a variable resistor R5, so that the gain of the interface circuit can be adjusted. A capacitor C1 is also provided between the points 73 to compensate for the capacitance associated with the deflection plates 16.

Equivalent interface means may be provided between the output leads 37 from the Line DAC 34 and the X deflection plates 14.

Also indicated in FIG. 2 are dotted lines 26 which represent lines of equal times from the start of each raster scan period (t), the lines 26 being both for the uncorrected, truncated flute shaped raster scan pattern, and the desired rectangular raster scan pattern produced in response to the analogue outputs from the Line DAC 34, and the Field DAC 36, respectively, on the leads 37 and 38, in the arrangement of FIG. 3 as so far described. Conveniently, the lines 26 represent linear portions of the display, which are required to be straight, and to be parallel with each other, and to be uniformly spaced, in a similar manner to the raster line scans. Any deviation from such an arrangement of the lines 26 is representative of the distortion in the display due to the cause of the deviation of the arrangement of the lines 26, in a similar manner to the distortion caused by the uncorrected raster scan pattern referred to above. It can be considered, to a close approximation, that the dotted lines 26 are straight lines, extending at right angles to the X axis, or the longitudinal axis of symmetry, of the CRT screen 10. There are shown in FIG. 2 five lines 26 which are equi-distributed in time throughout each raster line scan period (t). It can be seen, however, that there is not the desired uniform spacing between the illustrated dotted lines 26, in relation to the CRT screen 10, and because of this the display provided would be distorted. From the start of each raster scan line period, the spacings on the CRT screen 10 between adjacent pairs of illustrated dotted lines 26 decreases in a non-uniform manner, because of the differences in the electron beam paths as the electron beam traverses the raster scan line, and as illustrated in FIG. 1. In order to correct for this distortion of the display it is necessary to arrange that the scanning speed of the electron beam along each raster scan line increases in a complementary, non-uniform manner, the variations in the scanning speed being the same for each raster scan line, when the lines 26 of equal times are considered to be straight lines. The required increases in scanning speed are obtained by providing corresponding increases in the potential differences $V_x$ of the differential signals applied to the X deflection plates 14, from the output of the Line DAC 34, uniformly for each raster line scan.

One way of obtaining such required non-linear increases in the scanning speed of the electron beam, uniformly for each raster line, is by arranging the Line DAC 34 to operate in accordance with a required non-linear function, the Line DAC still being driven by differential digital signals from the Line counter 31. This function is, at least substantially, exponential in form, an exponential function, to a close approximation, representing the required, corresponding, non-linear increases in the potential differences $V_x$ of the differential analogue signals to be applied to the X deflection plates 14. As indicated in FIG. 3, the exponential variation of the differential analogue signals $V_{x1}$ from the Line DAC, over any raster scan line period (t), and representative of corresponding exponential variations in the potential differences $V_x$ of differential analogue signals to be applied to the X deflection plates 14, can be represented by a graph, the shape of which graph is the inverse of the shape of the graph of the amount distortion of linear portions of the display parallel to the Y axis, otherwise obtained, in relation to the spacings of the linear display portions along the X axis of the CRT screen 10. Thus, the differential signals $V_{x1}$ vary from representing zero, to a maximum positive value, uniformly, over each raster line scan period (t).

The required non-linear output of the segmented Line DAC 34 is determined in an empirical manner, and is represented by the non-linear relationship between successive resistors R1 of the series of current sources 42 of the Line DAC. As described above in relation to FIG. 4, the Line DAC 34 has sixteen constituent segments, or current sources 42. In particular, several of the lower order resistors R1, within the series of resistors, are arranged to be infinite, so that the function, in accordance with which the Line DAC operates, initially has a significant portion representing a zero potential difference output $V_{x1}$ for the DAC. Then the stepped potential difference output of the DAC increases rapidly, in accordance with the required exponential function, the resistances within the current sources decreasing rapidly throughout the series of sixteen resistors R1.

The exponential function associated with the manner of operation of the Line DAC, and referred to above, is required to be combined with an appropriate linear function, generated in any convenient way, and similar to, but not identical with, the linear function described above in relation to the Field DAC, and to cause the Line DAC to provide each raster line scan.

Thus, the non-linear differential analogue output from the Line DAC 34, on the two leads 37, corrects for distortion due to the straight lines 26 of equal times, and which are equi-distributed in time throughout each raster line scan period, but not being uniformly spaced in relation to the CRT screen 10.

Hence, the operation of the DAC's 34, 35 and 36, can be considered as mapping, in a dynamic sense, any irregularity of the raster scan pattern otherwise produced on the screen 10 of the CRT tube, the DAC's operating to be the equivalent to an analogue memory in the respect. It is possible that each DAC operates in accordance with a function which has one, or more, non-linear components, and a linear component.

In general, it can be considered that the combination of the Field DAC 36 and the Field Correction DAC 35 is capable of shifting pixels, of the raster scan pattern, possibly individually, prallel to the Y axis of the CRT screen 10, when the raster scan pattern varies along the X axis. Similarly, it can be considered that the Line DAC 34 is capable of shifting pixels, possibly individually, paallel to the X axis of the CRT screen 10, when there is otherwise distortion of the display produced, the amount of such distortion varying along the X axis, uniformly for each raster line scan.

The use of the DAC's 34, 35 and 36, in correcting for distortion of the raster scan pattern, otherwise produced, is advantageous in that it enables the means to generate the required functions, to be employed to shape the waveforms to be applied to the deflection plates 14 and 16, to operate satisfactorily without having to consider the effects of variations in the operating temperatures of the means, or of variations in the supply voltage to drive the means. Conveniently, appropriate compensations for inadvertent variations of the operating temperature, and/or of the supply voltage, can be made at the outputs of the DAC's, and before the differential analogue outputs of the DAC's are applied to the deflection plates.

A flat screen CRT display system as described above may comprise any required form of information display system. For example, at least because of the presence of the Line DAC 34 and the Field DAC 36, in order to provide the required undistorted raster scan pattern, a pixel addressable display system may be provided, the Line divider 31 and the Field divider 32 being replaced by registers.

Alternatively, the flat screen CRT display system may comprise a TV receiver arranged to operate in accordance with a known transmission system, for example, the United States 525 display field line transmission system, or the European 625 display field line transmission system.

It is possible to apply the output of the Line DAC 34 to integrating means generating a conventional raster line scan sawtooth waveform, so that the energy consumption of the arrangement is less than otherwise would be the case, the output of the Line DAC being in accordance solely with the non-linear function referred to above, and modifying in the required manner the sawtooth waveforms. Thus, the integrated output of the Line DAC encodes electron beam scanning speed, and not pixel positions, in relation to each raster line scan.

If the Line DAC output is integrated, as described below, the subdivision system 45 is omitted in Line DAC 34, and, hence, the switches 47 are only two-way switches instead of the three-way switches otherwise required. Thus, the steps of the stepped analogue output from the Line DAC each represent multiples of pixel positions. Otherwise the Line DAC 34 operates in the manner described above for a segmented DAC. This manner of operation of the Line DAC is adequate.

Because the output from the Line DAC 34 is of a differential form, being provided on two leads 37, a suitable arrangement for applying the stepped, exponentially varying, output from the Line DAC 34 to the integrating means is shown in FIG. 8. Each constituent part of the differential output is supplied to an integrator 80, each integrator 80 comprising a capacitor C2 in parallel with an amplifier 02, and is arranged to have a time constant equal to the raster line scan period (t). The two integrated parts of the differential signal are then supplied, individually, to the two X deflection plates 14. Hence, the deflection signals supplied to the X deflection plates comprise a smoothly continuous waveform in each raster line scan period (t), the waveform varying in the desired way. The extra high voltage $V_{EHT}$ associated with the CRT is applied to each amplifier 02.

If the outut of either the Line DAC 34 of the Field DAC 36 is applied to the deflection plates via integrating means, such as an amplifier 02 and a capacitor C2, as shown in FIG. 8, the integrating means to provide sawtooth waveforms, the analogue output of the DAC causing required compensating factors to be applied to the sawtooth waveforms, it is not essential that the DAC operates upon differential digital input signals thereto, nor that, in response, the DAC provides differential analogue outputs therefrom.

However, the dotted lines 26, of equal times from the start of each raster line scan period, usually are not straight lines, as shown in FIG. 2, but are at least substantially exponential in shape, being symmetrically arranged about the X axis, or the centre raster line of the raster scan pattern.

Hence, the required non-linear function to represent the required deflection signals $V_x$ to be applied to the X deflection plates 14 is not merely represented by the empirically determined exponential, output from the Line DAC 34, as described above, and varying over a raster line scan period (t), uniformly for each raster line scan, but, instead, to a close approximation, is required to be represented by an exponential of such a Line DAC output, over the raster frame scan period (T), in order, effectively, to correct for distortion due to the exponential lines 26 of equal times, and which are equi-distributed in time throughout each raster line scan period (t), but not being substantially uniformly spaced on the CRT screen 10.

In order to compensate for the distortion corresponding to the dotted lines 26, of equal times from the start of each raster line scan period, not being straight lines, as shown in FIG. 2, as shown in FIG. 9 the arrangement of FIG. 3 is modified by the inclination of a Line Correction DAC 100.

FIG. 9 corresponds to FIG. 3, and parts identical with, or closely resembling, each other in the arrangements of the two Figures are identified by the same reference numerals. However, the arrangement of FIG. 9 differs from that of FIG. 3 by the inclusion of the Line Correction DAC 100, which operates in accordance with a required, empirically derived, non-linear function, and therefore comprises a segmented DAC as described above in relation to FIGS. 4 and 5. The Line Correction DAC 100 receives the same digital signals from the Field counter 32 as the Field DAC 36, the output of the Line Correction DAC therefore varying over each raster frame scan period (T). The corresponding differential analogue output from the Line Correction DAC 100 is supplied to modify the reference voltage V1 supplied to the non-linear Line DAC 34, over each raster frame scan period (T), as indicated generally by the provision of the lead 102 therebetween, the interaction between the Line Correction DAC and the Line DAC being obtained in the same manner as described above in relation to the interaction of the Field Correction DAC 35 on the Field DAC 36, as indicated by the provision of the line 39 in FIGS. 3 and 6.

The segmented Line DAC 34 is arranged to operate in accordance with an empirically derived non-linear function as described above in relation to FIG. 3, in order to correct for the non-uniformity of the spacings in relation to the CRT screen 10 of the lines 26 of equal times which are equi-distributed in time throughout each raster line scan period (t), and considering that the lines 26 are straight lines extending at right angles to the X axis of the CRT screen.

Further, in order to correct for distortion due to the lines 26 of equal times from the start of each raster line scan period (t) not being straight lines, the Line Correction DAC 100 is required to operate in accordance with a required, empirically derived, non-linear function, varying over each raster frame scan period (T), and in relation to the Y axis of the CRT screen 10. Thus, it is required that the function represented by the analogue output of the Line DAC 34 is the combination of the non-linear function in accordance with which the Line DAC operates, as referred to in the preceding paragraph, varying over each raster line scan period (t), and the non-linear function in accordance with which the Line Correction DAC 100 is required to operate, as referred to above in this paragraph, varying over each raster frame scan period (T), and the Line Correction DAC is required to be driven by differential digital signals from the Field counter 32. As indicated in FIG. 9, the non-linear variation of the differential analogue signals $V_{x2}$ from the Line Correction DAC, over any raster frame scan period (T), and representative of corresponding non-linear variations in the potential differences $V_x$ of differential analogue signals to be applied to the X deflection plates 14, can be represented by a graph, the shape of which graph is the inverse of the shape of the curved lines 26 otherwise obtained in relation to the Y axis of the CRT screen 10. Thus, the differential signals $V_{x2}$ vary from a maximum positive value at the start of each raster frame scan period (T), to zero mid-way through each raster frame scan period (T), before returning to the same maximum positive value at the end of each raster frame scan period. Hence, the output of the Line Correction DAC 100 is required to interact with the operation of the Line DAC 34. In this manner, the output of the Line DAC 34, in accordance with the combined function, causes corresponding deflection signals to be applied to the X deflection plates 14 which correct for the distortion due to the curved lines 26 of equal times, which are equi-distributed in time throughout each raster line scan period, not being uniformly spaced in relation to the CRT screen 10. The combined function is the inverse of the function capable of representing the curved lines 26 in relation to the Y axis of the CRT screen 10.

The required, empirically-derived, non-linear differential output of the segmented Line Correction DAC 100 is represented by the non-linear relationship between successive resistors R1 of the series of current sources 42 of the Line Correction DAC. The Line Correction DAC 100 has sixteen constituent segments, or current sources 42. Conveniently, as in the Line DAC 34, the subdivision system 45 is omitted in the Line Correction DAC, and, hence, the switches 47 are two-way switches.

It is required that at any instant within each raster line scan period (t), considered individually, the varying reference voltage $V'''$ applied between the rails 43 and 44 of the Line DAC, and comprising the variable gain of the Line DAC, is given by the expression:

$$V''' = V1 + V_{x2}$$

where V1 is the constant output voltage of the reference source 60.

Further, at the output of the Line DAC 34, it is required that this expression is modified in the following manner, over each raster frame scan period (T):

$$V'_{x1} = (V1 + V_{x2}) \cdot k' V_{x1}$$

where k' is a constant.

Further, the value $KV_{x2}$, where K is another constant, is required to be added to the output $V'_{x1}$ of the Line DAC in order to provide the required differential analogue signals to be applied to the X deflection plates.

Thus, the display obtained is without distortion in relation to the Y axis of the CRT screen 10.

FIG. 10 shows the required form of the interaction 102 between the output of the Line Correction DAC 100 and the Line DAC 34. FIG. 10 corresponds to FIG. 6, and parts identical with, or closely resembling, each other in the two Figures are identified by the same reference numbers. In the same way as FIG. 9 differs from FIG. 3 by the inclusion of the Line Correction DAC 100, FIG. 10, which differs from FIG. 9 by indicating the supply of the refernce voltages to the DAC's 34, 35, 36 and 100, differs from FIG. 6 also by the inclusion of the Line Correction DAC 100. The constant output V1 of the common reference voltage source 60 is shown as being connected directly to the Line Correction DAC 100. Further, the Line DAC 34 is shown as being connected to the output of the common reference voltage source 60 via a known form of summing means indicated generally at 104. The varying analogue output $V_{x2}$ of the Line Correction DAC 100 is supplied to a negative input of the summing means 104, and is considered as providing the required compensating voltage to be added to the constant output V1 of the refernce voltage source 60, before the corresponding varying reference voltage V1'' is supplied to the Line DAC 34. In addition, the differential analogue output $V'_{x1}$ of the Line DAC is supplied to a further summing means 106, and the differential analogue output $V_{x2}$ of the Line Correction DAC is supplied to the positive input of the summing means 106. The corresponding differential analogue output $V_x$ of the summing means 106 comprises the deflection signals $V_x$ required to be supplied to the X deflection plates.

It is not essential that the empirically-derived, non-linear function in accordance with which the Line DAC 34 now operates, over each raster line scan period (t), is, at least substantially, exponential in form. Similarly, nor is it essential that the empirically derived, non-linear function in accordance with which the Line Correction DAC 100 operates, over each raster frame scan period (T), is, at least substantially, exponential in form. For convenience, no required attenuation means is shown in FIG. 10.

The arrangement shown in FIGS. 3 and 6, including the Field Correction DAC 35 interacting with the Field DAC 36, also is capable of compensating for either the electron gun assembly 12, possibly inadvertently, not extending parallel to the longitudinal axis of symmetry of the rectangular shaped CRT screen 10, or if the construction of the flat screen CRT is such that the electron gun assembly is angularly displaced, upto an angle of 90°, from the longitudinal axis of symmetry, or X axis of the CRt screen, although still extending in a plane parallel to the screen plane. In consequence, the longitudinal axis of symmetry of the flute shaped, uncorrected, raster scan pattern produced thereby is angularly displaced from the longitudinal axis of symmetry of the CRT screen 10. Such a flat screen CRT is shown in plan in FIG. 11. FIG. 11 corresponds to FIG. 2, and parts identical with, or closely resembling, each other in the two flat screen CRT's are identified by the same reference numbers in both Figures. The flat screen CRT of FIG. 9 differs from that shown in FIG. 2 only in that the electron gun assembly 12 is angularly displaced from the longitudinal axis of the symmetry, or X axis of the CRT screen 10, in addition to being laterally displaced in relation to the CRT screen. The modified envelope for the display system is indicated at 18'. Also indicated are the extremities of the different electron beam paths in order to provide the required raster scan pattern in relation to the CRT screen 10.

Appropriate linear functions are to be combined to the functions described above in relation to the arrangement of FIG. 3 in accordance with which the Line DAC 34 and Field Correction DAC 35, considered individually, operate over each raster line scan period (t). The forms for the combined functions from the Line DAC 34 and the Field DAC 36, represented, respectively, by the corresponding deflection signals $V_x$ and $V_y$, are such that they, respectively, represent the inverse of the function capable of representing the shape of the distorted, flute shaped raster scan pattern in relation to the Y axis of the CRT screen 10, and the inverse of the function capable of representing the lines 26 of equal times, and which are equi-distributed in time throughout each raster line scan period, in relation to the X axis of the CRT screen. In this manner, the output $V_x$ of the Line DAC 34 on the leads 37, in accordance with the related combined function, causes corresponding deflection signals to be applied to the X deflection plates 14; and the output $V_y$ of the Field DAC 36 on the leads 38, in accordance with the related combined function, causes corresponding deflection signals to be applied to the Y deflection plates 16; to correct for the distortion of the raster scan pattern otherwise produced in relation to the rectangular shaped CRT screen 10 on which the raster scan pattern is produced.

However, the arrangements so far described cannot correct for pin-cushion or barrel distortion of the display reproduced on the CRT screen 10. Such an arrangement, capable of correcting for pin-cushion or barrel distortion is shown in FIGS. 12 and 13.

Figure 12:
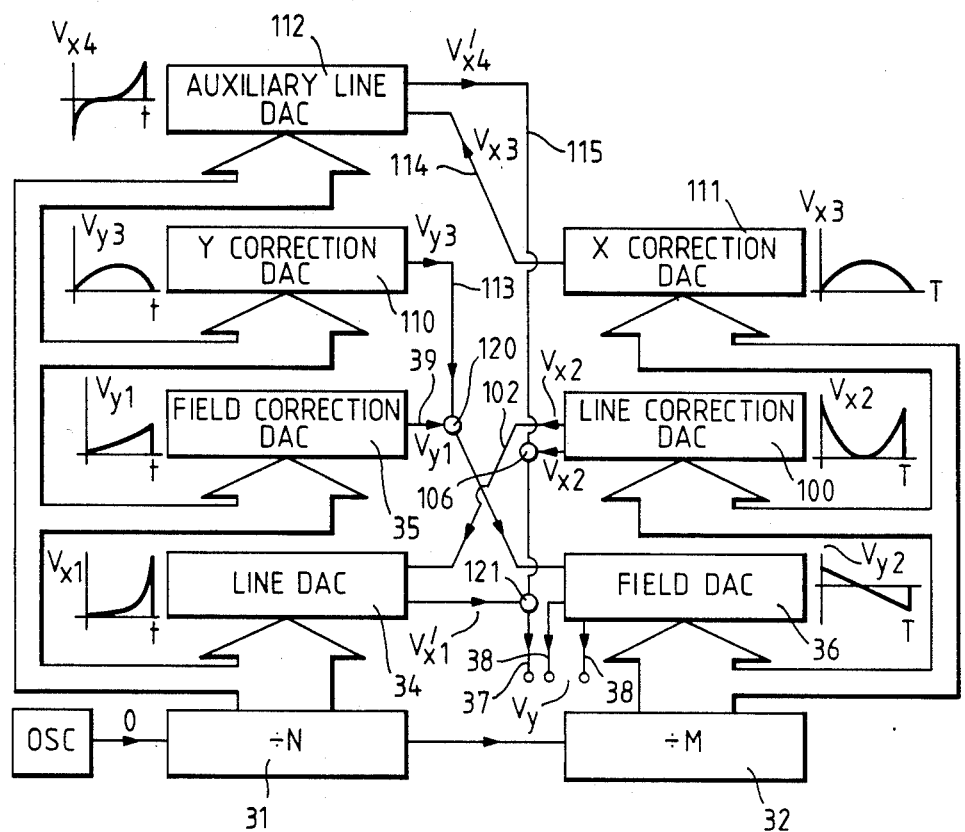
Figure 13:
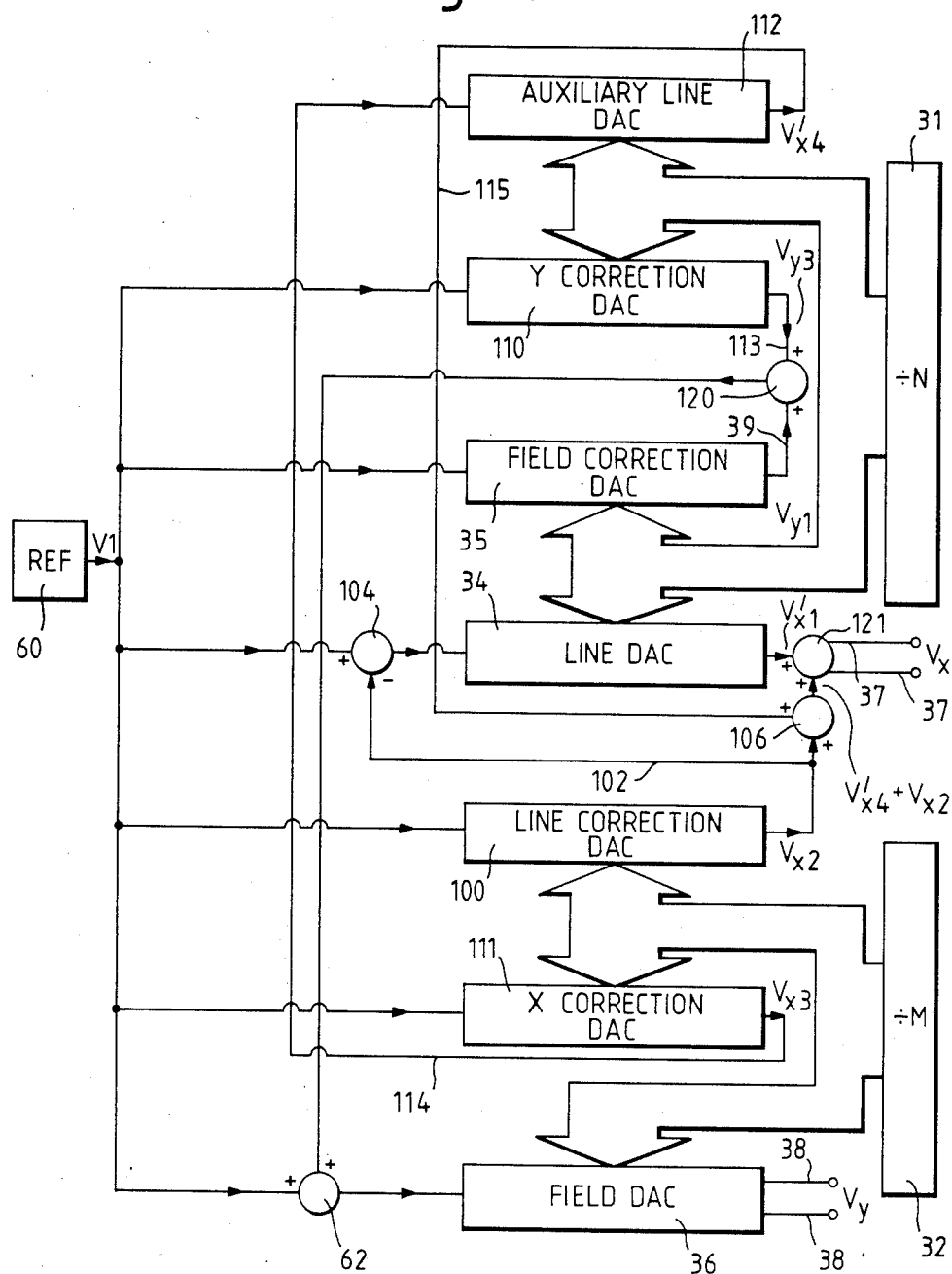

FIG. 12 corresponds to FIG. 9, and parts identical with, or closely resembling, each other in the arrangement of the two Figures are identified by the same reference numbers in both Figures. However, in FIG. 12 there is included a non-linear DAC 110, designated a Y Correction DAC, a non-linear DAC 111, designated an X Correction DAC, and a non-linear DAC 112, designated an Auxiliary Line DAC.

The non-linear output of the Y Correction DAC 110, driven by the digital signals from the Line counter 31, is required to be summed with the non-linear output of the Field Correction DAC 35, as indicated generally by the provision of a lead 113 extending therebetween. Conveniently, the Y Correction DAC 110 and the Field Correction DAC 35 may be combined in one DAC arranged to operate in accordance with a required non-linear function.

The non-linear output of the X Correction DAC 111, driven by the digital signals from the Field counter 32, is required to interact with the non-linear manner of operation of the Auxiliary Line DAC 112, as indicated generally by the provision of a lead 114 extending therebetween, the Auxiliary Line DAC 112 being driven by the digital signals from the Line counter 31. The non-linear output from the Auxiliary Line DAC 112, when so interacted by the output from the X Correction DAC 111 is required to be summed with the non-linear output from the Line DAC 34, as indicated generally by the provision of the lead 115 extending therebetween. For convenience, the line 115 is shown as being supplied to the summing means 106 also connected to the output of the Line Correction DAC 100.

As indicated in FIG. 12, the non-linear variations of the differential analogue signals $V_{y3}$ from the Y Correction DAC 110, over the first raster line scan period (t), and representative of corresponding non-linear variations in the potential differences $V_y$ of differential analogue signals to be applied to the Y deflection plates 16, can be represented by a graph, the shape of which graph is the inverse of the shape of the pin-cushion or barrel distortion of the first raster line scan, otherwise obtained, in relation to the X axis of the CRT screen 10. Hence, the function represented by the non-linear output $V_{y3}$ of the Y Correction DAC 110, on the lead 113, is the inverse of the function representative of the pin-cushion or barrel distortion, shown in FIG. 12 in relation to pin-cushion distortion, and required to be corrected in the first raster line, in relation to the X axis of the CRT screen 10, in the first half of a raster scan pattern, ignoring the variable scaling factor introduced, over the raster frame scan period (T), by the Field DAC 36. Thus, the differential signals $V_{y3}$ vary from representing zero at the start of each raster line scan period (t), to a maximum positive value at the mid-point of the raster line scan period, returning to zero at the end of the raster line scan period. The non-linear output of the Y Correction DAC 110, on the lead 113, is summed with the simultaneous, non-linear output of Field Correction DAC 35, by a known form of summing means, indicated at 120 in FIG. 12. The combined output is caused to interact with the appropriate linear operation of the Field DAC 36, in the same manner as the non-linear of the Field Correction DAC 35 alone in the arrangements of FIGS. 3 and 6, and FIGS. 9 and 10, and as indicated generally by the provision of the lead 39 therebetween.

At the input of the Field DAC 36, it is required that at any instant within each raster line scan period (t), considered individually, the varying reference voltage $V'''$ applied between the rails 43 and 44 of the Field DAC, comprising the variable gain of the Field DAC, is given by the expression:

$$V''' = V1 = V_{y1} + V_{y3}$$

where V1 is the constant output voltage of the reference source 60.

Further, at the output of the Field DAC 36, it is required that this expression is modified in the following manner, over each raster frame scan period (T):

$$V_y = Y_{y2}(V1 + V_{y1} + V_{y3})k$$

where k is a constant, equal t the reciprocal of the maximum value for $V_{y2}$. Thus, pin-cushion distortion of the first raster scan line is corrected in relation to the X axis of the CRT screen 10, and when the variable scaling factor, introduced, over the raster frame scan period (T), by the Field DAC 36 is taken into account, the pin-cushion distortion, of equal magnitude, but of opposite senses, in the two constituent halves of the raster frame scan period, is corrected, in a similar manner to the correction of the flute shaped distortion as described above in relation to the arrangement of FIGS. 3 and 6.

As also is indicated in FIG. 12, the non-linear variations of the differential analogue signals $V_{x3}$ from the X Correction DAC 111, at the start of each raster line scan, over a raster frame scan period (T), and representative of corresponding non-linear variations in the potential differences $V_x$ of differential analogue signals to be applied to the X deflection plates 14, can be represented by a graph, the shape of which graph is the inverse of the shape of the pin-cushion or barrel distortion, otherwise obtained, at the extreme LHS portion of the raster scan pattern, paallel to the Y axis. Hence, the function represented by the non-linear output $V_{x3}$ of the X Correction DAC 111, on the lead 114, is the inverse of the function representative of the pin-cushion or barrel distortion, shown in FIG. 12 in relation to pin-cushion distortion, required to be corrected in relation to the Y axis of the CRT screen 10, and in respect of the start of each raster line. Thus, the differential signals $V_{x3}$ vary from representing zero at the start of each raster frame scan period (T), to a maximum positive value at the centre raster line of the raster frame scan period, returning to zero at the end of the raster frame scan period. The non-linear output of the X correction DAC 111 is caused to interact with the non-linear manner of operation of the Auxiliary Line DAC 112, as indicated generally by the provision of the lead 114 therebetween, in the same manner as the non-linear output of the Field Correction DAC 35 interacts with the manner of operation of the Field DAC 36 in the arrangement of FIGS. 3 and 6, and as indicated generally by the provision of the lead 39 therebetween.

Further as indicated in FIG. 12, the non-linear variations of the differential anallgue signals $V_{x4}$ from the Auxiliary Line DAC 112, considered individually, and uniformly over each raster line scan period (t), representative of corresponding non-linear variations in the potential differences $V_x$ of differential analogue signals to be applied to the X deflection plates 14, can be represented by a graph, the shape of which graph corresponds to the inverse of the representation of the amount of pin-cushion distortion otherwise obtained in any raster line scan spaced from the longitudinal boundaries of the raster scan pattern. Hence, the function represented by the non-linear output $V_{x4}$ of the Auxiliary Line DAC 112, considered individually, and uniformly over each raster line scan period, is representative of the pin-cushion distortion, required to be corrected in relation to the Y axis of the CRT screen 10, and in respect of each such raster line. Thus, the differential signals $V_{x4}$ vary from a maximum negative value at the start of each raster line scan period (t), to zero at the mid-point of each raster line scan period, to a maximum positive value at the end of each such raster line scan period, the magnitude of the maximum positive value being equal to that of the maximum negative value.

However, the manner of operation of the Auxiliary Line DAC 112 over each raster line scan period (t) is interacted by the non-linear output $V_{x3}$ from the X Correction DAC 111 over each raster frame scan period (T), as indicated generally by the provision of the lead 114 therebetween, and in the same way as the interaction, indicated generally by the provision of the lead 39 therebetween, of the manner of operation of the Field DAC 36 by the non-linear output from the Field Correction DAC 35, in the arrangement of FIGS. 3 and 6. The corresponding output of the Auxiliary Line DAC 112 in accordance with the combined function is indicated as being $V'_{x4}$, on the lead 115.

Further, the non-linear output $V'_{x4}$ of the Auxiliary Line DAC 112, on the lead 115, is summed with the simultaneous, non-linear output of the Line Correction DAC 100, by the summing means 106, and then with the non-linear output of the Line DAC 34, by a known form of summing means, indicated at 121 in FIG. 12.

It is required that at any instant within each raster line scan period (t), considered individually, the reference voltage applied between the rails 43 and 44 of the Auxiliary Line DAC is $V_{x3}$ from the output of the X Correction DAC 111, comprising the variable gain of the Auxiliary Line DAC. Thus, the corresponding output $V'_{x4}$ of the Auxiliary Line DAC is given by the expression:

$$V'_{x4} = k'' V_{x3} \cdot V_{x4}$$

where $k''$ is a constant.

Hence, the deflection signals $V_x$ applied to the X deflection plates are given by the expression:

$$V_y = V'_{x1} + V'_{x4} + K V_{x2} = (V1 + V_{x2}) \cdot k' V_{x1} k'' V_{x3} \cdot V_{x4} + K V_{x2}$$

where $V'_{x1}$ is the non-linear output from the Line DAC 34, and $V_{x2}$ is the non-linear output from the Line Correction DAC 100. Thus, pin-cushion distortion is corrected in relation to the Y axis of the CRT screen 10.

FIG. 13 corresponds to FIG. 10, and parts identical with, or closely resembling, each other in the arrangements of the two Figures are identified by the same reference numerals. However, as described above in relation to differences between the corresponding FIGS. 9 and 12, the arrangement of FIG. 13 differs from the arrangement of FIG. 10 by the inclusion of the Y Correction DAC 110, the X Correction DAC 111, the Auxiliary Line DAC 112, the associated interacting leads 113, 114 and 115, and the two summing means 120 and 121. The Auxiliary Line DAC 112 is not connected to the reference voltage source 60, but receives only the output of the X Correction DAC 111, on the lead 114, as the reference voltage therefor. For convenience, no required attentuation means is shown in FIG. 13.

The present invention, by which distortion of the raster scan pattern, otherwise produced, is compensated for by employing digitalmeans to drive DAC's, the DAC's being arranged to generate functions to shape the waveforms of the deflection signals to be applied to the X and Y deflection plates of the CRT, in the way required to compensate for the raster pattern distortion, may be incorporated in other types of CRT display system than a flat screen CRT display system as described above.

The CRT display system may include, for example, only a Line DAC and a Field DAC; or only these two DAC's and a Line Correction DAC.

The arrangement in accordance with the present invention in its most general form, having only as constituent DAC's the Line DAC 34 and the Field DAC, designated 36', is shown in FIG. 14. FIG. 14 corresponds to FIG. 3, and parts identical with, or closely resembling, each other in the arrangements of the two Figures are identified by the same reference numerals.

In the arrangement of FIG. 14, the Line DAC 34 is the same as in the arrangement of FIG. 3. As indicated in FIG. 14, the Line DAC 34 generates the required non-linear function to represent the analogue deflection signals $V_x$ to be applied to the X deflection plates, via lines 37, at least a constituent function component comprising the empirically determined exponential function referred to above, varying over each raster line scan period (t). However, the Field DAC 36', as also is indicated in FIG. 14, is arranged to generate a more complex function than the Field DAC 36 of the arrangement of FIG. 3. The more complex function required to be generated comprises the combination of the linear function, having zero value at its mid-point, and a negative slope, generated by the Field DAC 36 of FIG. 3, over the raster frame scan period (T), being indicated by the analogue signals $V_{y2}$; together with the function representing the inverse of the function of the distortion otherwise obtained in relation to the first raster line, this latter function being generated by the Field Correction DAC 35 of FIG. 3, over the raster line scan period (t), and being indicated by the analogue signals $V_y1$. For convenience, the combined function is indicated in FIG. 14 as comprising the linear function over the raster frame scan period (T), referred to above, but having a stepped form, with each constituent step having the raster line scan period (t), such a representation being accurate to a close approximation, and representing the analogue signals $V_y$ provided from the Field DAC 36' on the lines 38.

The digital means may have any convenient form instead of the oscillator, Line counter and Field counter.

The Line counter, and/or the Field counter, may be replaced by equivalent means. It may be convenient to replace either counter by equivalent means, whereby the parts of the digital signals corresponding to the MSB's of these signals are generated by counter stages, and are supplied to the decoder 48 of each DAC to be driven thereby; and the remaining parts of the digital signals, corresponding to the LSB's of these signals, are generated by shift register stages, and are supplied to the subdivision system 45 of each DAC to be driven thereby.

Each DAC may provide an analogue voltage output, such a segmented DAC having each constituent segment comprising a voltage source.

What I claim is:

1. A cathode ray tube (CRT) display systems including distortion correction means for the CRT including digital means arranged to drive digital to analogue converters (DAC's), in response, the DAC's being arranged to generate functions to shape the waveforms of deflection signals to be applied to the deflection plates of the CRT, the deflection signals to cause a conventional raster scan pattern coincident with the CRT screen, the digital means providing digital output signals, in response, the DAC's being arranged to generate the functions, each representative of variations of a corresponding analogue output from a DAC, the analogue output of a DAC, designated the Line DAC, being applied to the X deflection plates of the CRT, at least partially to cause each raster line scan, the analogue outut of a DAC, designated the Field DAC, being applied to the Y deflection plates of the CRT, the arrangement being such that the functions generated by the DAC's, and the waveforms of corresponding deflection signals to be applied to the deflection plates of the CRT, compensate for distortion, otherwise produced, of the raster scan pattern provided in relation to the screen, in each raster line scan period (t) the Line DAC being arranged to receive a first series of digital signals from the digital means, at a first constant repetition rate, in each raster frame scan period (T) the Field DAC being arranged to receive a second series of digital signals from the digital means, at a second repetition rate, there being one of the series of digital signals supplied to the Field DAC in each raster line scan period (t), and at least one further DAC, each such further DAC provided, considered individually, being arranged to receive one of the two series of digital series from the digital means, and, in response, is arranged to provide an analogue output over the associated period, the arrangement being such that the analogue output from said further DAC interacts with the manner of operation of another DAC, over the period associated with said other DAC, and different from the period associated with said further DAC, said other DAC being arranged to receive the other series of digital signals from the digital means, the combined function generated thereby, at the output of said other DAC, including the inverse of the function representing the distortion capable of being corrected by the output of said other DAC causing corresponding deflection signals to be applied to associated deflection plates, in one constituent pair of interacting DAC's said other DAC comprising one of the Line DAC and the Field DAC.

2. A CRT display system as claimed in claim 1 the arrangement being such that at least said other DAC providing the combined function, of each pair of interacting DAC's considered individually, comprises a segmented DAC, and the required interaction is obtained by the variable analogue output of said further DAC causing corresponding variations in the gain of said other DAC.

3. A CRT display system as claimed in claim 2 in which each digital and analogue signal associated with the pair of interacting DAC's is of differential form, each constituent segment of said other, segmented DAC providing the combined function comprises a current source, connected between two rails of said other DAC, the two rails being common to each current source, and the arrangement is such that the gain of said other DAC is varied by the differential analogue output of said further DAC causing a corresponding, variable voltage input to be supplied to the two rails common to the current sources of said other DAC.

4. A CRT dislay system as claimed in claim 3 in which the arrangement is such that a reference voltage is applied between the two rails of said other DAC, and the voltage input to the two rails, caused by the different analogue output of said further DAC, is combined with the reference voltage, before the reference voltage is applied between the two rails.

5. A CRT display system as claimed in claim 1 in which there are at least two pairs of interacting DAC's, in one pair of interacting DAC's said other DAC comprises the Line DAC, and in another pair of interacting DAC's said other DAC comprises the Field DAC.

6. A CRT display system as claimed in claim 1 in which the digital means arranged to drive the DAC's comprises an oscillator having an output with a constant pulse repetition rate associated therewith, and arranged to be supplied to a Line counter, in response, the Line counter to supply the required digital signals to at least the Line DAC, the Line counter being arranged to be reset after each raster line scan period (t), and, in response to resetting, supplying a pulse to a Field counter, in response, the Field counter to supply the required digital signals to at least the Field DAC, the Field counter being arranged to be reset after each raster frame scan period (T).

7. A CRT display system as claimed in claim 1 in which each digital and analogue signal provided, and operated upon, within the distortion correction means for the CRT of the CRT display system is of differential form.

8. A CRT dislay system as claimed in claim 1 in which the CRT has the so-called flat screen form of construction, and in which system the waveforms of the deflection signals to be applied to the deflection plates of the flat screen CRT are required to be such that the conventional raster scan pattern provided has boundaries coincident with the boundaries of the rectangular shaped screen of the flat screen CRT.

9. A CRT display system as claimed in claim 1 in which at least one constituent DAC provides an analogue current output, such an output from one of the Line DAC and the Field DAC causing corresponding voltage deflection signals to be applied to the associated deflection plates.

10. A CRT display system as claimed in claim 1 in which at least one DAC has the so-called segmented form.

* * * * *